(12) United States Patent
Sato et al.

(10) Patent No.: US 9,266,975 B2
(45) Date of Patent: Feb. 23, 2016

(54) CONTINUOUS POLYMERIZATION APPARATUS AND PROCESS FOR PRODUCING POLYMER COMPOSITION

(71) Applicant: SUMITOMO CHEMICAL COMPANY, LIMITED, Chuo-ku, Tokyo (JP)

(72) Inventors: Yoshinori Sato, Singapore (SG); Kazuhiro Yamazaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/358,197

(22) PCT Filed: Nov. 8, 2012

(86) PCT No.: PCT/JP2012/079584
§ 371 (c)(1),
(2) Date: May 14, 2014

(87) PCT Pub. No.: WO2013/073595
PCT Pub. Date: May 23, 2013

(65) Prior Publication Data
US 2014/0329981 A1 Nov. 6, 2014

(30) Foreign Application Priority Data

Nov. 18, 2011 (JP) ................................ 2011-252988
Mar. 6, 2012 (JP) ................................ 2012-049554

(51) Int. Cl.
*C08F 2/01* (2006.01)
*C08F 2/02* (2006.01)
(Continued)

(52) U.S. Cl.
CPC .............. *C08F 2/01* (2013.01); *B01J 19/0046* (2013.01); *B01J 19/1862* (2013.01);
(Continued)

(58) Field of Classification Search
CPC ..... C08F 2/01; B01J 19/1862; B01J 2219/00103
USPC .................. 526/65, 918; 422/134; 525/53
See application file for complete search history.

(56) References Cited

U.S. PATENT DOCUMENTS 2,964,514 A  12/1960 Fawcett
3,875,128 A   4/1975 Suzuki et al.
(Continued)

FOREIGN PATENT DOCUMENTS

DE   1420673 A   11/1968
EP   0072165 A1   2/1983
(Continued)

OTHER PUBLICATIONS

Stamixco Heat Exchanger Product Bulletin HE-1.0 (2007).*
(Continued)

*Primary Examiner* — Fred M Teskin
(74) *Attorney, Agent, or Firm* — Sughrue Mion, PLLC

(57) ABSTRACT

The present invention provides a novel continuous polymerization apparatus which is able to efficiently produce a polymer composition suitable for obtaining a resin composition with high quality. In a continuous polymerization apparatus, at least, a first reactor of a complete mixing type and a second reactor of a complete mixing type (10, 20) are used. Each of the reactors (10, 20) is provided with a supply port (11a, 21a), an effluent port (11b, 21b), and a temperature detecting means (T) for detecting a temperature in the reactor, wherein the supply port (11a) of the first reactor (10) is connected to the supply sources (1, 3) of a raw material monomer and a polymerization initiator, and the effluent port (11b) of the first reactor is connected through a connection line (15) provided with a cooling means (16) to the supply port (21a) of the second reactor (20). The cooling means (16) is controlled to make the temperature in the connection line adjacent to the supply port (21a) of the second reactor lower than the temperature in the first reactor (10).

7 Claims, 2 Drawing Sheets

(51) Int. Cl.
  *B01J 19/18* (2006.01)
  *B01J 19/00* (2006.01)
  *C08F 2/38* (2006.01)
  *C08F 220/14* (2006.01)

(52) U.S. Cl.
  CPC .... *B01J 2219/002* (2013.01); *B01J 2219/0004* (2013.01); *B01J 2219/0024* (2013.01); *B01J 2219/00063* (2013.01); *B01J 2219/00094* (2013.01); *B01J 2219/00103* (2013.01); *B01J 2219/00213* (2013.01); *B01J 2219/00231* (2013.01); *B01J 2219/00236* (2013.01); *B01J 2219/00238* (2013.01); *B01J 2219/00736* (2013.01)

(56) References Cited

U.S. PATENT DOCUMENTS

| | | | |
|---|---|---|---|
| 4,271,280 | A * | 6/1981 | Tomura et al. ............. 526/65 |
| 4,282,339 | A | 8/1981 | Donaldson et al. |
| 5,728,793 | A | 3/1998 | Kumagai et al. |
| 6,214,942 | B1 | 4/2001 | Siol et al. |
| 6,632,907 | B1 | 10/2003 | Mizota et al. |
| 7,220,048 | B2 * | 5/2007 | Kohlgruber et al. ......... 366/147 |
| 2006/0089474 | A1 | 4/2006 | Yamazaki et al. |
| 2013/0041117 | A1 | 2/2013 | Hayashida et al. |

FOREIGN PATENT DOCUMENTS

| | | |
|---|---|---|
| EP | 2450101 A1 | 5/2012 |
| EP | 2481476 A1 | 8/2012 |
| EP | 2481477 A1 | 8/2012 |
| EP | 2500363 A1 | 9/2012 |
| GB | 1467045 | 3/1977 |
| GB | 2221855 A | 2/1990 |
| JP | 51-29914 B | 8/1976 |
| JP | 52-17555 B | 5/1977 |
| JP | 58-21406 A | 2/1983 |
| JP | 62-89710 A | 4/1987 |
| JP | 01-172401 A | 7/1989 |
| JP | 1-53682 B | 11/1989 |
| JP | 3-49925 A | 3/1991 |
| JP | 4-48802 B2 | 8/1992 |
| JP | 05-331212 A | 12/1993 |
| JP | 7-126308 A | 5/1995 |
| JP | 2000053712 A | 2/2000 |
| JP | 2003096105 A | 4/2003 |
| JP | 2004-211105 A | 7/2004 |
| JP | 2006-104282 A | 4/2006 |
| KR | 100689598 B1 | 2/2007 |
| WO | 2013073595 A1 | 5/2013 |

OTHER PUBLICATIONS

International Preliminary Report on Patentability and Written Opinion issued May 20, 2014 in International Application No. PCT/JP2012/079854.

First Office Action issued on Feb. 2, 2015 in counterpart Chinese patent application No. 201280056416.4 with English translation.

Communication dated Dec. 8, 2015 from the Japanese Patent Office in counterpart application No. 2012-049554.

Communication dated Nov. 27, 2015 from the State Intellectual Property Office of the People's Republic of China in counterpart Application No. 201280056416.4.

* cited by examiner

CONTINUOUS POLYMERIZATION APPARATUS AND PROCESS FOR PRODUCING POLYMER COMPOSITION

TECHNICAL FIELD

The present invention relates to a continuous polymerization apparatus, i.e. an apparatus for continuously conducting a polymerization. Additionally, the present invention relates to a process for producing polymer composition which is conducted by using such continuous polymerization apparatus.

BACKGROUND ART

Resin compositions such as methacrylic ester polymers are produced by continuous polymerization in which a raw material monomer, a polymerization initiator and so on are continuously supplied to a reactor to be polymerized. As such continuous polymerization processes, there are known a continuous solution polymerization process using a solvent (or a dispersion medium, which also applies hereinafter) to conduct continuous polymerization, and a continuous bulk polymerization process using no solvent to conduct continuous polymerization.

In general, a continuous solution polymerization process is not efficient since use of a solvent causes a low productivity. In contrast, a continuous bulk polymerization process has an advantage of being able to produce a polymer composition efficiently since the polymerization is conducted without using a solvent. Practically, the continuous bulk polymerization, however, has various problems compared with the continuous solution polymerization, such as that reaction control is difficult due to high viscosity of a reaction mixture, and when an inner surface of a reactor is cooled to remove heat from a reaction system, this degrades quality of a polymer composition and thus of a resin composition obtained therefrom. Therefore, a process is proposed which uses a reactor of a complete mixing type, fully fills the reactor with liquid to exclude a gas phase part therefrom, and conducts continuous bulk polymerization under an adiabatic condition with no heat transfer to or from the outside (Patent Literature 1). Further, in order to assure such adiabatic condition, a continuous polymerization apparatus is proposed which controls a supply amount of a raw material monomer and a supply amount of a polymerization initiator so as to make a temperature in the reactor equal to a setting temperature of an outer surface of the reactor (Patent Literature 2).

CITATION LIST

Patent Literature

Patent Literature 1: JP 07-126308 A
Patent Literature 2: JP 2006-104282 A
Patent Literature 3: JP 01-172401 A
Patent Literature 4: JP 05-331212 A
Patent Literature 5: JP 2004-211105 A

SUMMARY OF INVENTION

In recent years, applications of resin compositions such as methacrylic ester polymers has been expanded furthermore, a demand is increasing for more efficiently producing a polymer composition with high quality (for example, a polymer composition having superior properties such as heat resistance and thermal stability, and less immixed with impurities). However, it has been proved that the conventional continuous polymerization apparatus (Patent Literatures 1 and 2) are not always sufficient to meet the demand.

The purpose of the present invention is to provide a novel continuous polymerization apparatus and a process for producing a polymer composition wherein the process can be conducted by using such continuous polymerization apparatus and more efficiently produce the polymer composition suitable for producing a resin composition with high quality.

The inventors considered using at least two reactors of a complete mixing type in combination to conduct continuous polymerization. As to a continuous solution polymerization process, apparatuses having two stages of reactors are known, such as that the most part of polymerization is conducted in the former reactor and the polymerization is completed in the latter reactor while removing a polymerization initiator and the like therefrom (Patent Literature 3); and that polymerization is conducted to some extent in the former reactor and a solvent is added to the latter reactor to conduct polymerization (Patent Literature 4). In such apparatuses, however, removal of heat from a reaction system is conducted by reflux cooling (a raw material monomer or the like in the reactor is evaporated to be taken out of the reactor, and it is returned to the reactor again after subjected to cold condensation). Especially, in a case of conducting the polymerization in a less amount of solvent or with a high polymerization ratio in order to increase a productivity, a viscosity of a mixture in the reaction system becomes high, this makes the local or rapid cooling of the reaction system arise more easily, which makes the adhering and growing of the gel on the inner surface of the reactor prominent. As a result, there is a problem such as that gelled substance is immixed into a resultant polymer composition as impurities. On the other hand, as to a continuous solution polymerization process, a process is proposed which uses two stages of reactors, and set an average residence time in these reactors within the range given based on a half-life of a polymerization initiator (Patent Literature 5). In such apparatuses used in this process, however, removal of heat from a reaction system is conducted by using a jacket provided to an outer surface of the reactor. Especially, in a case of conducting the polymerization in a less amount of solvent or with a high polymerization ratio in order to increase a productivity, the local or rapid cooling by using the jacket provided to an outer surface of the second reactor is required for maintaining temperature in the first reactor and the second reactor at the same temperature to increase polymerization ratio in the second reactor, which makes adhering and growing of the gel on an inner surface of the reactor. As a result, the problem that gelled substance is immixed into a polymer composition as impurities cannot be solved, and quality of a resultant resin is not always sufficient. The inventors have considered earnestly on a novel continuous polymerization apparatus which can more efficiently produce a polymer composition suitable for producing a resin composition with high quality, and finally completed the present invention.

The present invention provides the following [1] to [9].

[1] A continuous polymerization apparatus which comprises, at least, a first reactor and a second reactor which are of a complete mixing type, wherein each of the reactors is provided with a supply port, an effluent port, and a temperature detecting means for detecting a temperature in the reactor, the supply port of the first reactor is connected to supply sources of a raw material monomer and a polymerization initiator, the effluent port of the first reactor is connected through a connection line provided with a cooling means to the supply port of the second reactor.

[2] The continuous polymerization apparatus according to the above [1], wherein the connection line is further provided with a mixing means.

[3] The continuous polymerization apparatus according to the above [1] or [2], wherein the effluent port of each of the reactors is placed at the top of the reactor.

[4] The continuous polymerization apparatus according to any one of the above [1]-[3], wherein the supply port of the second reactor or another supply port provided to the second reactor is connected to a supply source of an additional polymerization initiator.

[5] The continuous polymerization apparatus according to any one of the above [1]-[4], wherein the first reactor and the second reactor are used for conducting a continuous bulk polymerization.

[6] A process for producing a polymer composition by using the continuous polymerization apparatus according to any one of the above [1]-[5] which comprises:

a first polymerization step of continuously supplying a raw material monomer and a polymerization initiator from the supply sources of the raw material monomer and the polymerization initiator to the first reactor though the supply port of the first reactor to be subjected to continuous polymerization in the first reactor, and continuously taking a resultant intermediate composition from the effluent port of the first reactor, an intermediate cooling step of continuously cooling the intermediate composition by the cooling means of the connection line during transport of the intermediate composition from the effluent port of the first reactor to the supply port of the second reactor through the connection line, and a second polymerization step of continuously supplying the cooled intermediate composition to the second reactor through the supply port of the second reactor to be further subjected to continuous polymerization in the second reactor, and continuously taking a resultant polymer composition from the effluent port of the second reactor.

[7] The process for producing a polymer composition according to the above [6], wherein a temperature of the intermediate composition in the supply port of the second reactor is 5-80° C. lower than a temperature of the intermediate composition in the effluent port of the first reactor.

[8] The process for producing a polymer composition according to the above [6] or [7], wherein a temperature in the first reactor detected by the temperature detecting means of the first reactor and a temperature in the second reactor detected by the temperature detecting means of the second reactor are within the range of 120-150° C.

[9] A molded article which is prepared from the polymer composition produced by the process according to any one of the above [6]-[8].

According to the present invention, there is provided a novel continuous polymerization apparatus. Additionally, according to the present invention, there is provided a process for producing a polymer composition wherein the process can be conducted by using such continuous polymerization apparatus and more efficiently produce the polymer composition suitable for obtaining a resin composition with high quality.

Figure 1:
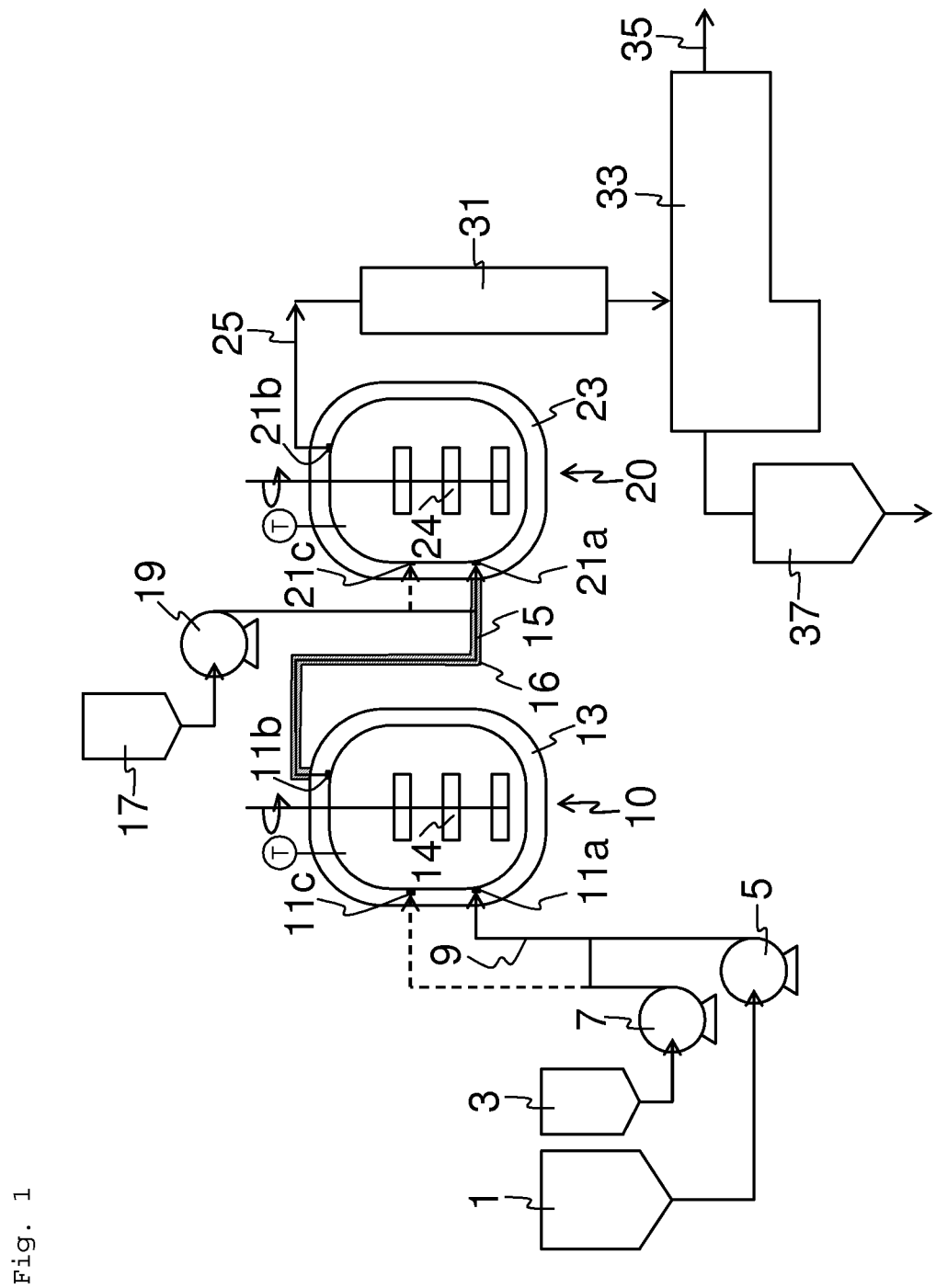
FIG. 1 shows a schematic view of a continuous polymerization apparatus in one embodiment of the present invention.

Following reference signs denote the following elements:
1 raw material monomer tank (supply source of raw material monomer)
3 polymerization initiator tank (supply source of polymerization initiator and, if necessary, of raw material monomer)
5 pump
7 pump
9 raw material supply line
10 first reactor
11a supply port
11b effluent port
11c another supply port
13 jacket (temperature regulating means)
14 stirrer
15 connection line
16 jacket (cooling means)
17 polymerization initiator tank (supply source of additional polymerization initiator and, if necessary, of raw material monomer)
19 pump
20 second reactor
21a supply port
21b effluent port
21c another supply port
23 jacket (temperature regulating means)
24 stirrer
25 effluent line
31 preheater
33 devolatilizing extruder
35 discharge line
37 recovery tank
40 cooler (cooling means)
T temperature sensor (temperature detecting means)

DESCRIPTION OF EMBODIMENTS

A continuous polymerization apparatus of the present invention comprises at least two reactors, and continuous polymerization such as any of continuous bulk polymerization and continuous solution polymerization is conducted in each of the reactors. The continuous polymerization apparatus of the present invention will be understood as a continuous bulk polymerization apparatus when continuous bulk polymerization is conducted in all of reactors, and understood as a continuous solution polymerization apparatus when continuous solution polymerization is conducted in all of the reactors. However, the continuous polymerization apparatus of the present invention is not limited thereto, but may be those wherein continuous bulk polymerization is conducted in one reactor (e.g. at least one former reactor) and continuous solution polymerization is conducted in another reactor (e.g. at least one latter reactor).

Hereinafter, one embodiment of the present invention will be described in detail with reference to FIG. 1.

A continuous polymerization apparatus in this embodiment comprises, at least, a first reactor 10 and a second reactor 20. These reactors 10 and 20 are both a reactor of a complete mixing type, and used to conduct continuous bulk polymerization in this embodiment.

More specifically, the first reactor 10 is provided with a supply port 11a and an effluent port 11b, and preferably further provided with a jacket 13 as a temperature regulating means for regulating a temperature of an outer surface of the reactor and a stirrer 14 for stirring contents therein. Similarly, the second reactor 20 is provided with a supply port 21a and an effluent port 21b, and preferably further provided with a jacket 23 surrounding an outer surface of the reactor as a temperature regulating means for regulating a temperature of the outer surface of the reactor and a stirrer 24 for stirring contents therein. The effluent ports 11b and 21b are located at a top of each of the reactors in this embodiment, but not limited thereto. On the other hand, the supply ports 11a and 21a may be generally located at an appropriate position of a lower part of each of the reactors, although this embodiment is not limited thereto. Each of these reactors 10 and 20 may be provided with a temperature sensor T as a temperature detecting means for detecting a temperature in the reactor.

The first reactor 10 and the second reactor 20 may have the same or different inner volume from each other. Making the inner volume of the first reactor and the inner volume of the second reactor different from each other, it is possible to effectively differentiate between the first reactor 10 and the second reactor 20 in an average residence time.

The stirrers 14 and 24 are a member for substantially attaining a complete mixing condition in the reactors. These stirrers may have any appropriate stirring blade(s), for example, may have blades of MIG impeller, MAXBLEND impeller (registered trademark, manufactured by Sumitomo Heavy Industries, Ltd.), paddle impeller, double helical ribbon impeller, FULLZONE impeller (registered trademark, manufactured by Kobelco Eco-Solutions Co., Ltd.) and so on. In order to increase stirring effect in the reactor, it is preferable to provide the reactor with a baffle(s). However, this embodiment is not limited thereto, but may have any appropriate configuration in place of the stirrers 14 and 24 as long as a complete mixing condition can be substantially attained in the reactors.

In general, the reactors 10 and 20 are more preferable when they have a higher stirring efficiency. However, in view of avoiding the reactors from being added with an unnecessary amount of heat by the stirring operation, it is preferable that a power of stirring is not more than necessary. The power of stirring is not particularly limited, but preferably 0.5 to 20 $kW/m^3$, and more preferably 1 to 15 $kW/m^3$. As a viscosity of the reaction system becomes higher (or a content ratio of a polymer in the reaction system becomes higher), it is preferable to set the power of stirring at a larger level.

As shown in the drawings, the supply port 11a of the first reactor 10 is connected through a raw material supply line 9 to a raw material monomer tank (a supply source of a raw material monomer) 1 and a polymerization initiator tank (a supply source of a polymerization initiator and, if necessary, of a raw material monomer) 3 via pumps 5 and 7, respectively. In this embodiment, the supply sources of the raw material monomer and the polymerization initiator are the raw material monomer tank 1 and the polymerization initiator tank 3, respectively. However, the number of the supply sources of the raw material monomer and the polymerization initiator, the forms of the raw material monomer and the polymerization initiator (in a case of a mixture, for example, a composition thereof) and so on are not particularly limited as long as the raw material monomer and the polymerization initiator can be supplied to the first reactor 10, appropriately. Although it is not necessary for this embodiment, but another supply port 11c may be provided to the first reactor 10 and this supply port 11c may be connected to the polymerization initiator tank 3 via the pump 7 as shown by a dotted line in FIG. 1. The effluent port 11b of the first reactor 10 is connected to the supply port 21a of the second reactor 20 through a connection line 15. The effluent port 21b of the second reactor 20 is linked up to an effluent line 25. Thus, the first reactor 10 and the second reactor 20 are connected in series. There is preferably no pump on the connection line 15 between the effluent port 11b of the first reactor 10 and the supply port 21a of the second reactor 20.

It is not necessary for the present invention, but the second reactor 20 is preferably connected to a polymerization initiator tank (a supply source of an additional polymerization initiator and, if necessary, of a raw material monomer) 17 via a pump 19. In this embodiment, the supply source(s) of the additional polymerization initiator is the polymerization initiator tank 17, but the number of the supply source(s) of the additional polymerization initiator, the form of the polymerization initiator (in a case of a mixture, for example, a composition thereof) and so on are not particularly limited as long as the additional polymerization initiator can be supplied to the second reactor 20, appropriately. In a case where the polymerization initiator tank 17 and the pump 19 are present, the supply port 21a of the second reactor 20 may be connected to the polymerization initiator tank 17 via the pump 19 through the connection line 15 as shown in FIG. 1, or the second reactor 20 may be provided with another supply port 21c so that this supply port 21c is connected to the polymerization initiator tank 17 via the pump 19 as shown by, for example, a dotted line in FIG. 1.

The pumps 5 and 7 and, if present, the pump 19 are not particularly limited, but preferably pumps being able to set flow rates from the raw material monomer tank 1 and the polymerization initiator tank 3 and a flow rate from the polymerization initiator tank 17, if present, at constant values. More specifically, multiple reciprocating pumps are preferred, and more preferred are pulsation-free controlled-volume pumps such as a duplicate pulsation-free controlled-volume pump and a triplex pulsation-free controlled-volume pump. By using these, it is possible to control a supply amount (or a supply flow rate, which also applies hereinafter) of the raw material monomer and the polymerization initiator to the first reactor 10 and, if necessary, an additional supply amount of the polymerization initiator (or the raw material monomer and the polymerization initiator) to the second reactor 20.

Figure 2:
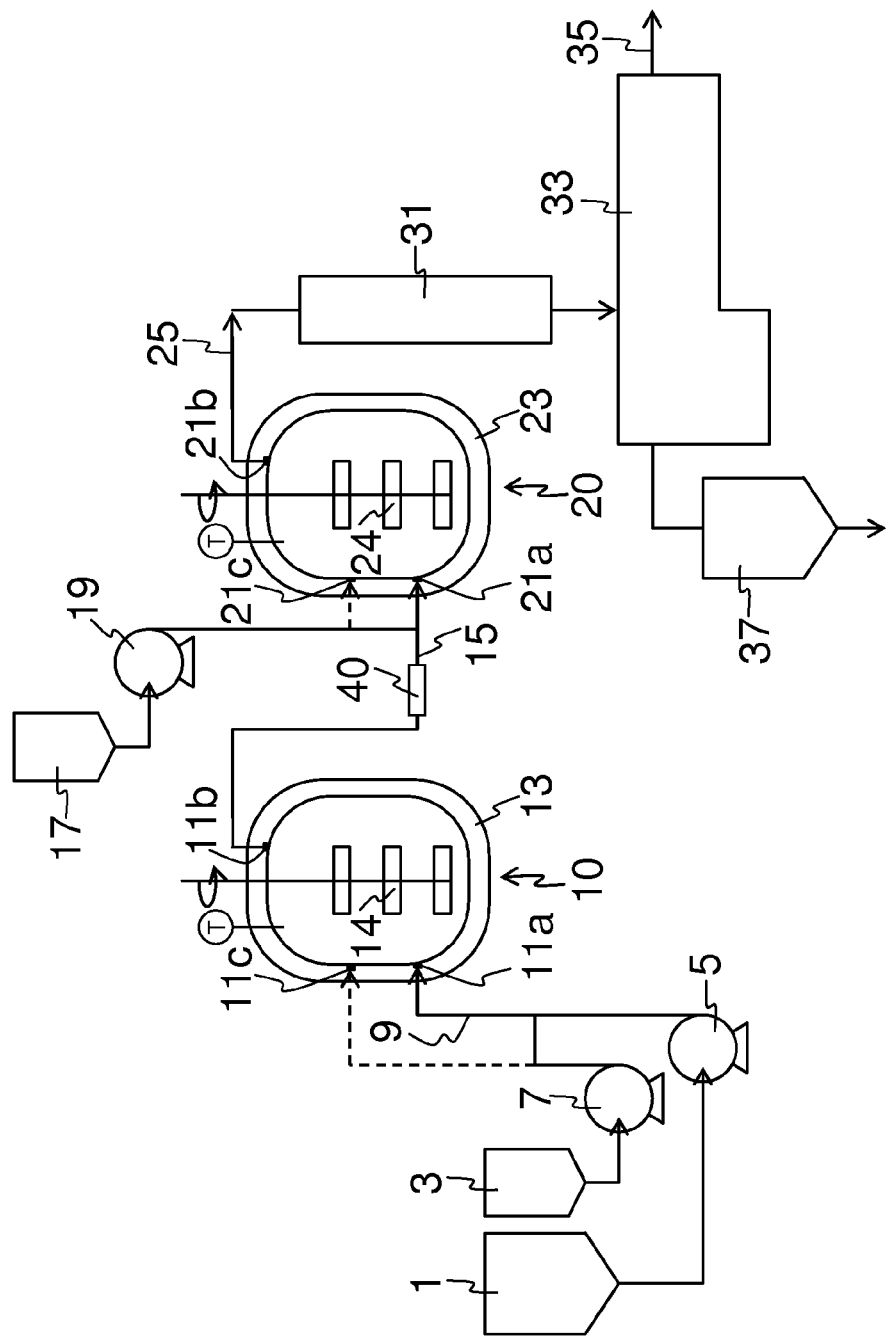
FIG. 2 shows a schematic view of a continuous polymerization apparatus in which a cooler is provided to the connection line in the embodiment of FIG. 1.

Further, the connection line 15 which connects the effluent port 11b of the first reactor 10 to the supply port 21a of the second reactor 20 is provided with, for example, a jacket 16 (shown by hatching in FIG. 1) surrounding a part of or the whole of an outer surface of the connection line 15, a cooler 40 with which a part of the connection line 15 is replaced as shown in FIG. 2, and/or a trace pipe through which a cooling medium pass (the connection line provided with the jacket is understood as a double pipe), as a cooling means being able to cool, at least partially, the connection line 15. Thereby, depending on the temperature of the first reactor 10 and/or the second reactor 20 and so on, the temperature of the connection line 15 (more specifically, the temperature in the inside of the connection line) can be more lower. As mentioned above, since the first reactor 10 is provided with the temperature sensor T as a temperature detecting means for detecting a temperature in the first reactor 10, the jacket 16 or the cooler 40 (a cooling means) of the connection line 15 can be controlled so that the temperature in the connection line 15 adjacent to the supply port 21a of the second reactor 20 is lower than the temperature in the first reactor 10 which is detected by the temperature sensor T. In FIG. 2, the cooler 40 is provided to the connection line 15 in any appropriate configuration, and the line parts other than the cooler 40 of the connection line 15 may be covered with a lagging to retain heat (not shown in the drawings), or a jacket (not shown in FIG. 2) surrounding an outer surface of the connection line 15 may be used in combination for cooling.

Further, it is not necessary for this embodiment, but the connection line 15 is preferably provided with a mixing means in that a temperature distribution in the connection line 15 can be more homogenized, and an occlusion of the connection line 15 by an intermediate composition (hereinafter described) which flows through in the connection line 15 can be suppressed. The mixing means is preferably provided to a cooling part of the connection line 15 in view of enhancing a cooling efficiency. Examples of the mixing means include, for example, a static mixer, a dynamic mixer, and so on. Among them, the static mixer is preferable. The static mixer is a mixer without a drive member, and is provided to the connection line 15 in any appropriate configuration. For example, in FIG. 1, the static mixer may be inserted into the connection line 15 at an appropriate position, or a part of or the whole of the connection line 15 may be replaced with the static mixer constituting the line. In FIG. 2, the static mixer can be inserted into a line part other than the cooler 40 of the connection line 15 at an appropriate position, or a part of or the whole of the line part other than the cooler 40 of the connection line 15 may be replaced with the static mixer constituting the line. Examples of the static mixer include, for example, "Sulzer mixer" (manufactured by Sulzer Chemtech Ltd.) and so on. For example, Sulzer mixer of SMX type, SMI type, SMV type, SMF type, or SMXL type can be used.

Further, in the embodiment shown in FIG. 2, a cooler which combines a cooling means and a mixing means may be provided as the cooler 40. Examples of the cooler 40 which combines a cooling means and a mixing means include a cooler having a dynamic mixing function and a cooler having a static mixing function. Examples of the cooler having a dynamic mixing function include, for example, a screw mixer being able to cool a cylinder and so on. Examples of the cooler having a static mixing function include, for example, a heat exchanger with a built-in static mixer and so on. As the heat exchanger with a built-in static mixer, preferably, Sulzer mixer of SMR type (manufactured by Sulzer Chemtech Ltd.) is used in view of having a large a heat-transfer area and being able to provide a high cooling capacity. In a case where the heat exchanger with a built-in static mixer is used as the cooler 40, a part of or the whole of the connection line 15 may be replaced with the heat exchanger with a built-in static mixer constituting the line.

It is preferable that each of the members described in the above with reference to FIG. 1 is appropriately connected to a control means described below (not shown in the drawings) and construct the whole so as to enable the control means to control their operations. Thereby, in order to make the temperature of the outer surface of the reactor set for each of the jackets (temperature regulating means) 13 and 23 correspond to the temperature in the reactor detected by the temperature sensor (temperature detecting means) T with respect to each of the first reactor 10 and the second reactor 20 (in the other words, in order to achieve an adiabatic condition in each of the first reactor 10 and the second reactor 20), the supply amounts of the raw material monomer and the polymerization initiator to the first reactor 10 can be adjusted by the operation of the pumps 5 and 7, or the temperature of the outer surface of the reactor set for the jackets 13 and 23 can be regulated; and also, in a case where the polymerization initiator tank 17 and the pump 19 are present, the additional supply amount of the polymerization initiator (or the raw material monomer and the polymerization initiator) to the second reactor 20 can be adjusted by the operation of the pump 19. Further, in order to achieve the desired polymerization ratio in the second reactor 20 and avoid a polymerization temperature in the second reactor 20 from being too high, it is possible to make the temperature in the connection line 15 adjacent to the supply port 21*a* of the second reactor 20 lower than the temperature in the first reactor 10 detected by the temperature sensor (temperature detecting means) T by adjusting the temperature of the outer surface of the connection line 15 set for the jacket (cooling means) 16 covering the connection line 15. In FIG. 2, the temperature in the connection line 15 adjacent to the supply port 21*a* of the second reactor 20 can become lower than the temperature in the first reactor 10 detected by the temperature sensor (temperature detecting means) T by adjusting a setting temperature of the cooler 40 with which a part of the connection line 15 is replaced. It is preferable that the temperature in the connection line 15 is actually measured at a place adjacent to the supply port 21*a* of the second reactor 20, or as the case may be, at other place by a temperature detecting means for detecting the temperature in the connection line 15. However, in some cases, depending on the polymerization reaction conditions in the first reactor 10, due to some causes such as that all of the supplied polymerization initiator is spent, an intermediate composition (hereinafter described) taken from the effluent port 11*b* does not let the polymerization reaction proceed in the connection line 15, that is, no heat of the polymerization reaction is generated in the connection line 15. In such case, considering the temperature in the connection line 15 adjacent to the effluent port 11*b* of the first reactor 10 as a substantially same temperature as the temperature in the first reactor 10 detected by the temperature sensor (temperature detecting means) T is allowable. Further, in such case, it is considered that the temperature in the connection line 15 adjacent to the supply port 21*a* of the second reactor 20 becomes lower than the temperature of the first reactor 10 by setting the temperature of the jacket 16 covering the connection line 15 or the temperature of the cooler 40 with which a part of the connection line 15 is replaced at a temperature lower than the temperature in the first reactor 10. In FIG. 2, when the line part other than the cooler 40 of the connection line 15 is provided with a jacket surrounding it, the temperature in the connection line 15 may be adjusted by using the jacket in combination.

The jackets 13 and 23 surround almost the whole of the reactors 10 and 20, respectively to appropriately heat or retain the heat of the reactors 10 and 20 by introducing steam, hot water, organic heat medium or the like from a heat medium supply route (not shown in the drawings). The temperature of the jackets 13 and 23 is able to be appropriately regulated with a temperature or pressure of the heat medium to be introduced. The heat medium introduced into the jackets 13 and 23 is removed from a heat medium discharge route (not shown in the drawings). The temperature and/or pressure of the jackets 13 and 23 are detected by a sensor such as a temperature sensor (not shown in the drawings) located on the heat medium discharge route. The point of location of a sensor such as the temperature sensor is not particularly limited, but it may be located, for example, on the heat medium supply route, or in the jackets 13 and 23. The jacket 16 provided to the connection line 15 as a cooling means may have the same constitution as that of the jackets 13 and 23. Although this embodiment is not limited thereto, the connection line 15 may be typically a double pipe, in which the internal space of the inner pipe is a flow path of an intermediate composition (hereinafter described), the space between the inner pipe and the outer pipe is a flow path of a heat medium (jacket 16).

For the polymerization reaction in the reactors 10 and 20, it is required to proceed at a generally constant temperature in each of the reactors 10 and 20 in view of obtaining a polymer with a constant quality. Therefore, the above described temperature regulating means (jackets 13 and 23) is controlled at a constant temperature which has been set beforehand, so that the temperature inside the reactors 10 and 20 can be maintained respectively at a generally constant temperature.

The setting temperature of the above described temperature regulating means (jackets 13 and 23) is transmitted to a control means described below, to be used as data for determining whether control of the supply flow rate with the monomer supply means (pump 5) and/or the initiator supply means (pump 7 and, if present, pump 19) is necessary or not. The setting temperature of the above described temperature regulating means (jackets 13 and 23) can be regulated by controlling the temperature or pressure of the above described heat medium.

Examples of the control means include, for example, a control unit (not shown in the drawings) provided with CPU, ROM, RAM and so on.

The ROM of the control means is a device for storing a program which controls the pumps 5 and 7 and, if present, the pump 19 and so on. The RAM of the control means is a device for temporary storing data of the temperatures in the reactors 10 and 20 detected by the temperature sensor T, data of the setting temperatures of the jackets 13 and 23, and data of the setting temperature of the jacket 16 or the cooler 40 of the connection line 15 and so on in order to execute the above program.

The CPU of the control means executes the program stored in the ROM based on data such as the data of the temperatures in the reactors 10 and 20 and the data of the setting temperatures of the jackets 13 and 23 stored in the above RAM so that the supply flow rates of the raw material monomer and/or the polymerization initiator to the reactors 10 and 20 is controlled by the monomer supply means (pump 5) and/or the initiator supply means (pump 7 and, if present, pump 19). With respect to the jacket 16 or the cooler 40 provided to the connection line 15 as a cooling means, the CPU of the control means executes the program stored in the ROM (which may be either a part of the above program or other program than the above program) based on data such as the data of the temperatures in the reactors 10 and 20 and the data of the setting temperature of the jacket 16 or the cooler 40 of the connection line 15 stored in the above RAM, and in the case of actually measuring, the temperature in the connection line 15 at the point adjacent to the supply port 21a of the second reactor 20 or other point, so that the setting temperature of the jacket or the cooler 40 of the connection line 15 can be adjusted.

An example of the control by the control means (control unit) will be described below.

When the temperature in the reactor 10 detected by the temperature sensor T exceeds the setting temperature of the jacket 13 as the temperature regulating means, the CPU executes the program in the ROM to control, for example, the pump 7 so as to decrease the supply flow rate of the polymerization initiator into the reactor 10. In a case where the polymerization initiator tank 17 and the pump 19 are present, when the temperature in the reactor 20 detected by the temperature sensor T exceeds the setting temperature of the jacket 23 as the temperature regulating means during the pump 19 supplies the polymerization initiator to the reactor 20 to conduct the polymerization, the CPU executes the program in the ROM to control, for example, the pump 19 so as to decrease the supply flow rate of the polymerization initiator into the reactor 20. By conducting such control, polymerization heat generated in the reactors 10 and/or 20 can be decreased, and thereby the temperatures in the reactors 10 and/or 20 can be lowered.

On the other hand, when the temperature in the reactor 10 is below the setting temperature of the jacket 13, the CPU executes the program in the ROM to control, for example, the pump 7 so as to increase the supply flow rate of the polymerization initiator into the reactor 10. In a case where the polymerization initiator tank 17 and the pump 19 are present, when the temperature in the reactor 20 is below the setting temperature of the jacket 23 during the pump 19 supplies the polymerization initiator to the reactor 20 to conduct the polymerization, the CPU executes the program in the ROM to control, for example, the pump 19 so as to increase the supply flow rate of the polymerization initiator into the reactor 20. By conducting such control, polymerization heat generated in the reactors 10 and/or 20 can be increased, and thereby the temperatures in the reactors 10 and/or 20 can be raised.

For example, when the control over the pump 7 and, if present, the pump 19 for the polymerization reaction in the reactors 10 and 20 results in remarkable decrease in the total supply flow rate into the reactors 10 and 20, it is preferable to not only control the pump 7 and, if present, the pump 19 so as to decrease the supply flow rate of the polymerization initiator, but also to control the pump 5 so as to increase the supply flow rate of the raw material monomer at the same time.

Further, as another example of the control, the following control is noted. That is, when the temperature in the reactor 10 detected by the temperature sensor T exceeds the setting temperature of the jacket 13 as the temperature regulating means, the pump 5 is controlled to increase the supply flow rate of the raw material monomer, so that the relative supply flow rate of the polymerization initiator into the reactor 10 is decreased. By conducting such control, the temperature in the reactor 10 can also be lowered.

A ratio of the supply flow rate of the raw material monomer and the supply flow rate of the polymerization initiator can be appropriately set depending on the kind of the polymer generated, the kind of the polymerization initiator used, and so on.

Also, degree of increase or decrease in the supply flow rate of the raw material monomer and/or the supply flow rate of the polymerization initiator can be appropriately set depending on the kind of the polymer generated, the kind of the polymerization initiator used, and so on. However, in a case what is supplied to the reactors 10 and 20 by the initiator supply means is not the polymerization initiator only, but the raw material monomer comprising the polymerization initiator, it is necessary to consider a content ratio of the polymerization initiator in the raw material monomer comprising polymerization initiator to control the supply flow rate of the polymerization initiator.

Further, as another example of the control, for the jacket 16 or the cooler 40 which is provided to the connection line 15 as a cooling means, the following control is noted. When the temperature in the connection line 15 adjacent to the supply port 21a of the second reactor 20 is the temperature in the first reactor 10 detected by the temperature sensor T or above, the CPU executes the program in the ROM to control a equipment associated with the jacket 16 or the cooler 40 (not shown in the drawings) so as to adjust a setting temperature of the jacket 16 or the cooler 40 of the connection line 15 at a lower temperature, so that the temperature in the connection line 15 adjacent to the supply port 21a of the second reactor 20 become a lower temperature, preferably 5-80° C. lower temperature, than the temperature in the first reactor 10. The setting temperature of the jacket 16 of the connection line 15 can generally be adjustable by controlling a flow rate and/or temperature of a heat medium flowed in the jacket 16, but not particularly limited thereto. The setting temperature of the cooler 40 of the connection line 15 can generally be adjustable, when a heat exchanger with a built-in static mixer is used as the cooler 40, by controlling a flow rate and/or temperature of a heat medium flowed in the heat exchanger with a built-in static mixer, but not particularly limited thereto.

As a preferable example of the control, the following control can be conducted. When the temperature in the second reactor 20 detected by the temperature sensor T of the second reactor 20 is the temperature in first reactor detected by the temperature sensor T of the first reactor 10 or above, the CPU executes the program in the ROM to appropriately control as mentioned above so as to adjust the setting temperature of the jacket 16 or the cooler 40 (and, when the cooler 40 and a jacket are used in combination, the jacket) of the connection line 15, so that the temperature in the connection line 15 adjacent to the supply port 21a of the second reactor 20 become a lower temperature, preferably 5-80° C. lower temperature, than the temperature in the first reactor 10; or to control the pumps 5 and 7 and, if present, the pump 19 so as to adjust the flow rate to the reactor 10 and/or the reactor 20. Thereby the temperature difference between the temperature in the first reactor 10 and the temperature of the second reactor 20 can be reduced. When a polymerization heat is generated in the second reactor 20, for example, due to the presence of the polymerization initiator tank 17 and the pump 19, it is effective to adjust the setting temperature of the jacket 16 or the cooler 40 (and, when the cooler 40 and a jacket are used in combination, the jacket) of the connection line 15.

Additionally, it is not necessary for this embodiment, but a preheater 31 and a devolatilizing extruder 33 may be located downstream of the effluent line 25. There may be a pressure adjusting valve (not shown in the drawings) provided between the preheater 31 and the devolatilizing extruder 33. An extruded object after devolatilization is discharged from a discharge line 35.

As the preheater 31, any appropriate heater can be used as long as it is able to heat a viscous fluid. As the devolatilizing extruder 33, a single or multi screw devolatilizing extruder can be used.

Further, there may be a recovery tank 37 for storing the raw material monomer which is separated and recovered from a volatile component (comprising unreacted raw material, mainly) separated with the devolatilizing extruder 33.

Next, a process for producing a polymer composition conducted by using such apparatus will be described. In this embodiment, a case of conducting continuous polymerization of a methacrylic ester monomer, in the other words, a case of producing a methacrylic ester polymer will be described as an example, although the present invention is not limited thereto.

Preparation

At first, the raw material monomer, the polymerization initiator and so on are prepared.

As the raw material monomer, a methacrylic ester monomer is used in this embodiment.

Examples of the methacrylic ester monomer are
alkyl methacrylate (of which alkyl group has 1 to 4 carbons) alone, or
a mixture of not less than 80% by weight of alkyl methacrylate (of which alkyl group has 1 to 4 carbons) and not more than 20% by weight of other vinyl monomer copolymerizable therewith.

Examples of alkyl methacrylate (of which alkyl group has 1 to 4 carbons) include methyl methacrylate, ethyl methacrylate, n-propyl methacrylate, isopropyl methacrylate, n-butyl methacrylate, t-butyl methacrylate, sec-butyl methacrylate, isobutyl methacrylate, and so on. Among them, methyl methacrylate is preferred. The above described examples of alkyl methacrylate may be used alone or in combination of at least two of them.

Examples of copolymerizable vinyl monomer include monofunctional monomers having one double bond which is radical-polymerizable and multifunctional monomers having two or more double bonds which are radical-polymerizable. More specifically, examples of the monofunctional monomers having one double bond which is radical-polymerizable include, for example, methacrylic esters such as benzyl methacrylate and 2-ethylhexyl methacrylate (except for the above described alkyl methacrylate (of which alkyl group has 1 to 4 carbons)); acrylic esters such as methyl acrylate, ethyl acrylate, propyl acrylate, butyl acrylate, and 2-ethylhexyl acrylate; unsaturated carboxylic acids or acid anhydrides thereof such as acrylic acid, methacrylic acid, maleic acid, itaconic acid, maleic acid anhydride, and itaconic acid anhydride; hydroxy group-containing monomers such as 2-hydroxyethyl acrylate, 2-hydroxypropyl acrylate, monoglycerol acrylate, 2-hydroxyethyl methacrylate, 2-hydroxypropyl methacrylate, and monoglycerol methacrylate; nitrogen-containing monomers such as acrylamide, methacrylamide, acrylonitrile, methacrylonitrile, diacetoneacrylamide, and dimethylaminoethyl methacrylate; epoxy group-containing monomers such as allyl glycidyl ether, glycidyl acrylate, and glycidyl methacrylate; styrene based monomers such as styrene and α-methylstyrene. Examples of the multifunctional monomers having two or more double bonds which are radical-polymerizable include, for example, diesters of unsaturated carboxylic acids and glycols such as ethylene glycol dimethacrylate, and butane diol dimethacrylate; unsaturated carboxylic acid alkenyl esters such as allyl acrylate, allyl methacrylate, and allyl cinnamate; polybasic acid polyalkenyl esters such as diallyl phthalate, diallyl maleate, triallyl cyanurate, and triallyl isocyanurate; esters of unsaturated carboxylic acids and polyalcohols such as trimethylolpropane triacrylate; and divinylbenzene. The above described examples of copolymerizable vinyl monomer may be used alone or in combination of at least two of them.

As the polymerization initiator, for example, radical initiator is used in this embodiment.

Examples of the radical initiator include azo compounds such as azobisisobutyronitrile, azobisdimethylvaleronitrile, azobiscyclohexanenitrile, 1,1'-azobis(1-acetoxy-1-phenylethane), dimethyl 2,2'-azobisisobutylate, and 4,4'-azobis-4-cyanovaleric acid; organic peroxides such as benzoyl peroxide, lauroyl peroxide, acetyl peroxide, caprylyl peroxide, 2,4-dichlorobenzoyl peroxide, isobutyl peroxide, acetyl cyclohexylsulfonyl peroxide, t-butyl peroxypivalate, t-butyl peroxyneodecanoate, t-butyl peroxyneoheptanoate, t-butyl peroxy-2-ethylhexanoate, 1,1-di(t-butylperoxy)cyclohexane, 1-di(t-butylperoxy)-3,3,5-trimethylcyclohexane, 1,1-di(t-hexylperoxy)-3,3,5-trimethylcyclohexane, isopropyl peroxydicarbonate, isobutyl peroxydicarbonate, s-butyl peroxydicarbonate, n-butyl peroxydicarbonate, 2-ethylhexyl peroxydicarbonate, bis(4-t-butylcyclohexyl) peroxydicarbonate, t-amyl peroxy-2-ethylhexanoate, 1,1,3,3-tetramethyl butyl peroxy-ethylhexanoate, 1,1,2-trimethyl propyl peroxy-2-ethylhexanoate, t-butyl peroxy isopropyl monocarbonate, t-amyl peroxy isopropyl monocarbonate, t-butyl peroxy-2-ethylhexyl carbonate, t-butyl peroxy allyl carbonate, t-butyl peroxy isopropyl carbonate, 1,1,3,3-tetramethyl butyl peroxy isopropyl monocarbonate, 1,1,2-trimethyl propyl peroxy isopropyl monocarbonate, 1,1,3,3-tetramethyl butyl peroxy isononate, 1,1,2-trimethyl propyl peroxy-isononate, and t-butyl peroxybenzoate.

These polymerization initiators may be used alone or in combination of at least two of them.

The polymerization initiator is selected depending on the kinds of the polymer to be produced and the raw material monomer used. For example, although the present invention is not particularly limited, as the polymerization initiator (radical initiator), those of which $\tau/\theta$ (–) is, for example not more than 0.1, preferably not more than 0.02, more preferably not more than 0.01 can be used, wherein $\tau$ (second) represents a half-life of the polymerization initiator at the polymerization temperature, and $\theta$ (second) represents an average residence time in a reactor. When the value of $\tau/\theta$ is not more than the above value, a polymerization reaction can be effectively initiated because the polymerization initiator is sufficiently decomposed (thus, generating a radical) in a reactor. Further, since the polymerization initiator is sufficiently decomposed in the first reactor 10, it can be effectively suppressed to decompose the polymerization initiator to initiate polymerization in the connection line 15, as a result, it can be effectively avoided to increase a viscosity of the intermediate composition during it passes through the connection line 15, and/or to occlude the connection line 15 by the intermediate composition.

The supply amount of the polymerization initiator (radical initiator) is not particularly limited, but generally 0.001 to 1% by weight with respect to the raw material monomer (the raw material monomer eventually supplied to the reactor 10). In a case where the polymerization initiator tank 17 and the pump 19 are present in addition to the polymerization initiator tank 3 and the pump 7, the polymerization initiator can be supplied separately into the first reactor 10 and the second reactor 20. When the polymerization initiator tank 17 supplies the mixture of the raw material monomer and the polymerization initiator to the second reactor 20 by the pump 19, the total supply amount of the polymerization initiator supplied to the reactor 10 and the reactor 20 is made within the above range with respect to the sum of the raw material monomer eventually supplied to the reactor 10 and the raw material monomer additionally supplied to the reactor 20.

In addition to the raw material monomer and the polymerization initiator described above, any appropriate other component(s), for example, a chain transfer agent, a mold release agent, a rubbery polymer such as butadiene and styrene-butadiene rubber (SBR), a thermal stabilizing agent, and an ultraviolet absorbing agent may be used. The chain transfer agent is used for adjusting a molecular weight of a produced polymer. The mold release agent is used for improving moldability (or processability) of a resin composition obtained from the polymer composition. The thermal stabilizing agent is used for preventing a produced polymer from thermal degradation. The ultraviolet absorbing agent is used for preventing a produced polymer from being degraded by ultraviolet rays.

As to the chain transfer agent, either monofunctional or polyfunctional chain transfer agent can be used. More specifically, examples thereof include alkyl mercaptans such as n-propyl mercaptan, isopropyl mercaptan, n-butyl mercaptan, t-butyl mercaptan, n-hexyl mercaptan, n-octyl mercaptan, 2-ethylhexyl mercaptan, n-dodecyl mercaptan, and t-dodecyl mercaptan; aromatic mercaptans such as phenyl mercaptan and thiocresol; mercaptans having 18 or less carbons such as ethylene thioglycol; polyalcohols such as ethylene glycol, neopentyl glycol, trimethylolpropane, pentaerythritol, dipentaerythritol, tripentaerythritol, and sorbitol; those of which hydroxyl group is esterified with thioglycolic acid or 3-mercaptopropionic acid, 1,4-dihydronaphthalene, 1,4,5,8-tetrahydronaphthalene,β-terpinene, terpinolene, 1,4-cyclohexadiene, hydrogen sulfide and so on. These may be used alone or in combination of at least two of them.

The supply amount of the chain transfer agent is not particularly limited since it varies depending on the kind of the chain transfer agent used and so on. For example, in a case of using mercaptans, it is preferably 0.01 to 3% by weight, and more preferably 0.05 to 1% by weight with respect to the raw material monomer (the raw material monomer eventually supplied to the reactor 10).

Examples of the mold release agents are not particularly limited, but include esters of higher fatty acids, higher fatty alcohols, higher fatty acids, higher fatty acid amides, metal salts of higher fatty acids and so on. As the mold release agent, one or more kinds thereof may be used.

Examples of the esters of higher fatty acids specifically include, for example, saturated fatty acid alkyl esters such as methyl laurate, ethyl laurate, propyl laurate, butyl laurate, octyl laurate, methyl palmitate, ethyl palmitate, propyl palmitate, butyl palmitate, octyl palmitate, methyl stearate, ethyl stearate, propyl stearate, butyl stearate, octyl stearate, stearyl stearate, myristyl myristate, methyl behenate, ethyl behenate, propyl behenate, butyl behenate, octyl behenate; unsaturated fatty acid alkyl esters such as methyl oleate, ethyl oleate, propyl oleate, butyl oleate, octyl oleate, methyl linoleate, ethyl linoleate, propyl linoleate, butyl linoleate, octyl linoleate; saturated fatty acid glycerides such as lauric monoglyceride, lauric diglyceride, lauric triglyceride, palmitic monoglyceride, palmitic diglyceride, palmitic triglyceride, stearic monoglyceride, stearic diglyceride, stearic triglyceride, behenic monoglyceride, behenic diglyceride, behenic triglyceride; unsaturated fatty acid glycerides such as oleic monoglyceride, oleic diglyceride, oleic triglyceride, linolic monoglyceride, linolic diglyceride, linolic triglyceride. Among them, methyl stearate, ethyl stearate, butyl stearate, octyl stearate, stearic monoglyceride, stearic diglyceride, stearic triglyceride, and son on are preferred.

Examples of the higher fatty alcohols specifically include, for example, saturated fatty (or, aliphatic) alcohols such as lauryl alcohol, palmityl alcohol, stearyl alcohol, isostearyl alcohol, behenyl alcohol, myristyl alcohol, cetyl alcohol; unsaturated fatty (or aliphatic) alcohols such as oleyl alcohol, linolyl alcohol. Among them, stearyl alcohol is preferred.

Examples of the higher fatty acids specifically include, for example, saturated fatty acids such as caproic acid, caprylic acid, capric acid, lauric acid, myristic acid, palmitic acid, stearic acid, arachidic acid, behenic acid, lignoceric acid, 12-hydroxyoctadecanoic acid; unsaturated fatty acids such as palmitoleic acid, oleic acid, linoleic acid, linolenic acid, cetoleic acid, erucic acid, ricinoleic acid.

Examples of the higher fatty acid amides specifically include, for example, saturated fatty acid amides such as lauric acid amide, palmitic acid amide, stearic acid amide, behenic acid amide; unsaturated fatty acid amides such as oleic acid amide, linoleic acid amide, erucic acid amide; amides such as ethylene-bis-lauric acid amide, ethylene-bis-palmitic acid amide, ethylene-bis-stearic acid amide, N-oleyl stearamide. Among them, stearic acid amide and ethylene-bis-stearic acid amide are preferred.

Examples of the metal salts of higher fatty acids include, for example, sodium salts, potassium salts, calcium salts and barium salts of the above-described higher fatty acids, and so on.

A used amount of the mold release agent is preferably adjusted in a range from 0.01 to 1.0 part by weight, and more preferably adjusted in a range from 0.01 to 0.50 part by weight, with respect to 100 parts by weight of a polymer contained in a polymer composition to be obtained.

Examples of the thermal stabilizing agent are not particularly limited, but include, for example, phosphorous-based thermal stabilizing agent and organic disulfide compounds. Among them, the organic disulfide compounds are preferable. As the thermal stabilizing agent, one or more kinds thereof may be used.

Examples of the phosphorus-based thermal stabilizing agent include, for example, tris(2,4-di-t-butylphenyl)phosphite, 2-[[2,4,8,10-tetrakis(1,1-dimethylethyl)dibenzo[d,f][1,3,2]dioxaphosphepine-6-yl]oxy]-N,N-bis[2-[[2,4,8,10-tetrakis(1,1-dimethylethyl)dibenzo[d,f][1,3,2]dioxaphosphepine-6-yl]oxy]-ethyl]ethanamine, diphenyl tridecyl phosphite, triphenyl phosphite, 2,2-methylenebis(4,6-di-tert-butylphenyl)octylphosphite, bis(2,6-di-tert-butyl-4-methylphenyl)pentaerythritol diphosphite, and so on. Among them, 2,2-methylenebis(4,6-di-tert-butylphenyl)octylphosphite is preferred.

Examples of the organic disulfide compounds include, for example, dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide, di-tert-dodecyl disulfide, and so on. Among them, di-tert-alkyl disulfide is preferred, and di-tert-dodecyl disulfide is more preferred.

A used amount of the thermal stabilizing agent is preferably 1-2,000 ppm by weight with respect to a polymer contained in a polymer composition to be obtained. On molding a polymer composition (more specifically, a resin composition after devolatilization) to prepare a molded article from the polymer composition of the present invention, a molding temperature is set at a higher temperature for the purpose of improving its molding processability in some cases. Use of the thermal stabilizing agent is effective for such case.

As the kinds of the ultraviolet absorbing agent, a benzophenone-based ultraviolet absorbing agent, a cyanoacrylate-based ultraviolet absorbing agent, a benzotriazole-based ultraviolet absorbing agent, a malonic ester-based ultraviolet absorbing agent, an oxalic anilide-based ultraviolet absorbing agent and so on are exemplified. These ultraviolet absorbing agents may be used alone or in combination of at least two of them. Among them, the benzotriazole-based ultraviolet absorbing agent, the malonic ester-based ultraviolet absorbing agent, and the oxalic anilide-based ultraviolet absorbing agent are preferable.

Examples of the benzophenone-based ultraviolet absorbing agent include, for example, 2,4-dihydroxybenzophenone, 2-hydroxy-4-methoxybenzophenone, 2-hydroxy-4-methoxybenzophenone-5-sulfonic acid, 2-hydroxy-4-octyloxybenzophenone, 4-dodecyloxy-2-hydroxybenzophenone, 4-benzyloxy-2-hydroxybenzophenone, 2,2'-dihydroxy-4,4'-dimethoxybenzophenone, and so on.

Examples of the cyanoacrylate-based ultraviolet absorbing agent include, for example, ethyl 2-cyano-3,3-diphenylacrylate, 2-ethylhexyl 2-cyano-3,3-diphenylacrylate, and so on.

Examples of the benzotriazole-based ultraviolet absorbing agent include, for example, 2-(2-hydroxy-5-methylphenyl)-2H-benzotriazole, 5-chloro-2-(3,5-di-tert-butyl-2-hydroxyphenyl)-2H-benzotriazole, 2-(3-tert-butyl-2-hydroxy-5-methylphenyl)-5-chloro-2H-benzotriazole, 2-(3,5-di-tert-pentyl-2-hydroxyphenyl)-2H-benzotriazole, 2-(3,5-di-tert-butyl-2-hydroxyphenyl)-2H-benzotriazole, 2-(2H-benzotriazole-2-yl)-4-methyl-6-(3,4,5,6-tetrahydrophthalimidyl-methyl)phenol, 2-(2-hydroxy-5-tert-octylphenyl)-2H-benzotriazole, and so on.

As to the malonic ester-based ultraviolet absorbing agent, 2-(1-aryl alkylidene)malonates are generally used, and examples thereof include dimethyl 2-(p-methoxybenzylidene)malonate and so on.

As to the oxalic anilide-based ultraviolet absorbing agent, 2-alkoxy-2'-alkyloxalic anilides are generally used, and examples thereof include 2-ethoxy-2'-ethyloxalic anilide and so on.

A used amount of the ultraviolet absorbing agent is preferably 5-1,000 ppm by weight with respect to a polymer contained in a polymer composition to be obtained.

In the raw material monomer tank 1, the raw material monomer (one kind or a mixture of two or more kinds) as described above is appropriately prepared (together with other component(s) such as the chain transfer agent as the case may be). In the polymerization initiator tank 3, the polymerization initiator as described above is appropriately prepared with the raw material monomer if necessary (together with other component(s) such as the chain transfer agent as the case may be). The polymerization initiator tank 3 may store the polymerization initiator alone or in the form of the mixture of the raw material monomer and the polymerization initiator (may further comprise other component(s) such as the chain transfer agent as the case may be). In a case of using the polymerization initiator tank 17, in the polymerization initiator tank 17, the polymerization initiator as described above is appropriately prepared with the raw material monomer if necessary (together with other component(s) such as the chain transfer agent as the case may be). The polymerization initiator tank 17 may store the polymerization initiator alone or in the form of the mixture of the raw material monomer and the polymerization initiator (may further comprise other component(s) such as the chain transfer agent as the case may be). However, in a case where the polymerization initiator tank 17 is connected to the supply port 21c via the pump 19, storing of the polymerization initiator alone raises a concern of local proceeding of the polymerization reaction in the reactor 20 since the polymerization initiator is solely supplied to the reactor 20. On the contrary, storing in the form of the mixture of the raw material monomer and the polymerization initiator is able to solve such concern since the polymerization initiator is mixed with a part of the raw material monomer beforehand.

First Polymerization Step

The raw material monomer and the polymerization initiator are continuously supplied to the first reactor 10 through the supply port 11a from the raw material monomer tank 1 and the polymerization initiator tank 3 as the supply source(s) of the raw material monomer and the polymerization initiator. More specifically, the raw material monomer is continuously supplied from the raw material monomer tank 1 by the pump 5, and the polymerization initiator (preferably, the mixture of the raw material monomer and the polymerization initiator, which is also simply referred to as the polymerization initiator herein) is supplied from the polymerization initiator tank 3 by the pump 7, and they merge together through the raw material supply line 9 into the first reactor 10 via the supply port 11a. Also, the polymerization initiator may be supplied from the polymerization initiator tank 3 by the pump 7 to the first reactor 10 via the supply port 11c as shown by the dotted line in FIG. 1.

For supplying the polymerization initiator to the first reactor 10, when the mixture of the raw material monomer and the polymerization initiator is prepared in the polymerization initiator tank 3 and supplied therefrom, it is preferable to adjust a ratio A:B in a range from 80:20 to 98:2 wherein A represents the supply flow rate (kg/h) of the raw material monomer from the raw material monomer tank 1, and B represents the supply flow rate (kg/h) of the mixture of the raw material monomer and the polymerization initiator (of which content ratio of the polymerization initiator is 0.002 to 10% by weight) from the polymerization initiator tank 3.

The temperature of the raw material monomer and the polymerization initiator supplied to the first reactor 10 is not particularly limited. However, this is one of factors which may change the polymerization temperature by losing a heat balance in the reactor, and therefore it is preferable to adjust that temperature appropriately by a heater/cooler (not shown in the drawings) before the supply to the reactor 10.

The raw material monomer and the polymerization initiator supplied to the first reactor 10 as described in the above are subjected to continuous polymerization, continuous bulk polymerization in this embodiment (in other words, polymerization with no solvent). This first polymerization step has only to proceed the polymerization reaction partway, and an intermediate composition is continuously taken from the effluent port 11b of the first reactor 10.

In the first polymerization step, the continuous polymerization can be conducted under a condition in which the reactor is filled with the reaction mixture while substantially no gas phase is present (hereinafter referred to as a fully filled condition). This is especially suitable for the continuous bulk polymerization. The fully filled condition can prevent beforehand the problems such as that gel adheres to and grows on the inner surface of the reactor, and that this gel is immixed into the reaction mixture to degrade quality of a polymer composition obtained in the end. Further, the fully filled condition enables all of the inner volume of the reactor to be used as a reaction space, and thereby a high productivity can be attained.

By locating the effluent port 11b of the first reactor 10 at the reactor's top as in this embodiment, the fully filled condition is conveniently realized simply by conducting the supply to and the taking from the first reactor 10, continuously. It is suitable for continuous polymerization of a methacrylic ester monomer that the effluent port is located at the reactor's top.

Further in the first polymerization step, the continuous polymerization may be conducted under the adiabatic condition (condition with substantially no heat transfer to or from outside of the reactor). This is especially suitable for the continuous bulk polymerization. The adiabatic condition can prevent beforehand the problems such as that gel adheres to and grows on the inner surface of the reactor, and that this gel is immixed into the reaction mixture to degrade quality of a polymer composition obtained in the end. Further, the adiabatic condition enables the polymerization reaction to become stable, and self regulating characteristics for suppressing a runaway reaction can be brought about.

The adiabatic condition can be realized by making the temperature of the inside of the first reactor 10 and the temperature of the outer surface thereof generally equal to each other. More specifically, this can be realized, with the use of the above described control means (not shown in the drawings), by adjusting the supply amounts of the raw material monomer and the polymerization initiator to the first reactor 10 with operating the pumps 5 and 7 such that the temperature of the outer surface of the first reactor 10 set for the jacket (temperature regulating means) 13 and the temperature in the first reactor 10 detected by the temperature sensor (temperature detecting means) T correspond to each other. It is not preferable to set the temperature of the outer surface of the reactor much higher than the temperature in the reactor since it adds extra amount of heat into the reactor. The smaller the difference between the temperature in the reactor and the temperature of the outer surface of the reactor is, the better it is. More specifically, it is preferable to adjust the temperature difference within the range of ±5° C.

The heat generated in the first reactor 10 such as polymerization heat and stirring heat is generally carried away on taking the intermediate composition from the first reactor 10. The amount of the heat carried away by the intermediate composition is determined by the flow rate and the specific heat of the intermediate composition, and the temperature of the polymerization reaction.

The temperature of the continuous polymerization in the first polymerization step is understood as the temperature in the first reactor 10 (detected by the temperature sensor T). The first polymerization step is conducted, for example, at a temperature in the range of 120 to 150° C., more preferably at a temperature in the range of 130 to 150° C. It is noted, however, that the temperature in the reactor may change according to various conditions until it reaches a static state.

The pressure of the continuous polymerization in the first polymerization step is understood as the pressure in the first reactor 10. This pressure is a pressure not less than a vapor pressure of the raw material monomer at the temperature in the reactor to prevent gas of the raw material monomer from generating in the reactor, and is generally about 1.0 to 2.0 MPa in gauge pressure.

A time period subjected to the continuous polymerization in the first polymerization step is understood as an average residence time in the first reactor 10. The average residence time in the first reactor 10 can be set according to the productivity of the polymer in the intermediate composition and so on, and is not particularly limited, but, for example, from 15 minutes to 6 hours. The average residence time in the first reactor 10 can be adjusted by using the pumps 5 and 7 to change the supply amount (supply flow rate) of the raw material monomer or the like to the first reactor 10. However, since the average residence time depends in a large part on the inner volume of the first reactor 10, how the inner volume of the first reactor 10 and the inner volume of the second reactor 20 are designed is important as hereinafter described.

As described in the above, the intermediate composition is continuously taken from the effluent port 11b of the first reactor 10. The obtained intermediate composition comprises the generated polymer and the unreacted raw material monomer, and may further comprise the unreacted polymerization initiator, decomposed substance of the polymerization initiator, and so on.

Although this embodiment is not limited thereto, the polymerization ratio in the intermediate composition is, for example, 5 to 80% by weight. The polymerization ratio in the intermediate composition generally corresponds to the content ratio of the polymer in the intermediate composition.

Intermediate Cooling Step

The intermediate composition obtained as described in the above is taken from the effluent port 11b of the first reactor 10, followed by passing through the connection line 15 and supplied to the second reactor 20 through the supply port 21a, continuously. During this time, the intermediate composition is continuously cooled by the jacket 16 or the cooler 40 which is a cooling means provided to the connection line 15.

Further, it is not necessary for the present invention, but it is preferable to provide the connection line 15 with a mixing means. By providing with the mixing means, the intermediate composition flowing in the connection line 15 is homogeneously mixed. As a result, a temperature distribution tends to be homogenized, and an occlusion of the connection line 15 by the intermediate composition can be suppressed. When the connection line 15 is provided with the mixing means, the connection line 15 may be provided with a static mixer or a dynamic mixer, or the connection line 15 may be provided with the cooler 40 which combines a mixing means and a cooling means.

Degree of cooling may be varied depending on difference between the temperature in the first reactor 10 and the temperature in the second reactor 20, and so on, for example, as in the preferable example of the control described in the above. The degree of cooling is adjusted depending on the desired polymerization temperature and polymerization ratio in the second reactor 20, specifically, the cooling can be conducted so that the temperature of the intermediate composition in the supply port 21a of the second reactor 20 become, for example, 5 to 80° C. lower temperature than the temperature of the intermediate composition in the effluent port 11b of the first reactor 10.

Second Polymerization Step

The second polymerization step is conducted in series with and following to the first polymerization step.

After the intermediate composition cooled by being passed through the connection line 15 as described in the above is supplied to the second reactor 20 from the supply port 21a. Then, the intermediate composition is further subjected to continuous polymerization, continuous bulk polymerization in this embodiment in the second reactor 20. This second polymerization step is to let the polymerization reaction proceed to the desired polymerization ratio, and a polymer composition (or polymerization syrup) is continuously taken from the effluent port 21b of the second reactor 20.

Hereinafter, the second polymerization step will be described mainly with respect to different points from the first polymerization step, and explanations similar to those for the first polymerization step apply unless otherwise explained.

Although it is not necessary to this embodiment, but it is preferable to use the polymerization initiator tank 17 and the pump 19. In a case of using the polymerization initiator tank 17 and the pump 19, the additional (or fresh) polymerization initiator (preferably, the mixture of the raw material monomer and the polymerization initiator) is supplied from the polymerization initiator tank 17 by the pump 19 through the connection line 15 to the second reactor 20 via the supply port 21a or the another supply port 21c, and thereby the additional polymerization initiator is added to the intermediate composition. The temperature of the polymerization initiator supplied to the second reactor 20 from the polymerization initiator tank 17 is not particularly limited. However, this is one of factors which may change in the polymerization temperature by losing a heat balance in the reactor, and therefore it is preferable to appropriately adjust the temperature by a heater/cooler (not shown in the drawings) before the supply to the reactor 20.

Further, cooling the intermediate composition taken from the first reactor by using the jacket 16 or the cooler 40 which is provided to the connection line 15 as a cooling means before supplying it to the second reactor, even if a polymerization heat is generated in the second reactor 20, it is possible to conduct continuous polymerization with avoiding generation of a temperature inhomogeneous state in the second reactor 20, and to achieve a high polymerization ratio with retain a low temperature in the second reactor 20, that is, to increase a productivity of the polymer. As a result, it is possible to effectively produce the polymer composition having superior thermal stability and heat resistance. Further, keeping a supply temperature of the intermediate composition to the second reactor 20 constant by adjusting the supply temperature by using the jacket 16 or the cooler 40 which is provided to the connection line 15 as a cooling means, it is possible to more stably conduct continuous polymerization in the second polymerization step.

For supplying the polymerization initiator to the second reactor 20, when the mixture of the raw material monomer and the polymerization initiator is prepared in the polymerization initiator tanks 3 and 17 and supplied therefrom, it is preferable to adjust a ratio A:(B1+B2) in a range from 80:20 to 98:2 and a ratio B1:B2 in a range from 10:90 to 90:10 wherein A represents the supply flow rate (kg/h) of the raw material monomer from the raw material monomer tank 1, B1 represents the supply flow rate (kg/h) of the mixture of the raw material monomer and the polymerization initiator (of which content ratio of the polymerization initiator is 0.002 to 10% by weight) from the polymerization initiator tank 3, and B2 represents a supply flow rate (kg/h) of the mixture of the raw material monomer and the polymerization initiator (of which content ratio of the polymerization initiator is 0.002 to 10% by weight) from the polymerization initiator tank 17.

Also, in the second polymerization step, the continuous polymerization can be conducted under a fully filled condition. This is especially suitable for the continuous bulk polymerization. The fully filled condition can prevent beforehand the problems such as that gel adheres to and grows on the inner surface of the reactor, and that this gel is immixed into the reaction mixture to degrade quality of the polymer composition obtained in the end. Further, the fully filled condition enables all of the inner volume of the reactor to be used as a reaction space, and thereby a high productivity can be attained.

By locating the effluent port 21b of the second reactor 20 at the reactor's top as in this embodiment, the fully filled condition is conveniently realized simply by continuously conducting the supply to and the taking from the second reactor 20, continuously. It is suitable for continuous polymerization of a methacrylic ester monomer that the effluent port is located at the reactor's top.

Also, further in the second polymerization step, the continuous polymerization may be conducted under the adiabatic condition. This is especially suitable for the continuous bulk polymerization. The adiabatic condition can prevent beforehand the problems such as that gel adheres to and grows on the inner surface of the reactor, and that this gel is immixed into the reaction mixture to degrade quality of the polymer composition obtained in the end. Further, the adiabatic condition enables the polymerization reaction to become stable, and self regulating characteristics for suppressing a runaway reaction can be brought about.

The adiabatic condition can be realized by making the temperature of the inside of the second reactor 20 and the temperature of the outer surface thereof generally equal to each other. More specifically, this can be realized, with the use of the above described control means (not shown in the drawings), by adjusting the supply amounts of the raw material monomer and the polymerization initiator to the second reactor 20 with operating the pumps 5 and 7 and, if present, the pump 19 such that the temperature of the outer surface of the second reactor 20 set for the jacket (temperature regulating means) 23 and the temperature in the second reactor 20 detected by the temperature sensor (temperature detecting means) T correspond to each other. It is not preferable to set the temperature of the outer surface of the reactor much higher than the temperature in the reactor since it adds extra amount of heat into the reactor. The smaller the difference between the temperature in the reactor and the temperature of the outer surface of the reactor is, the better it is. More specifically, it is preferable to adjust the temperature difference within the range of ±5° C.

The heat generated in the second reactor 20 such as polymerization heat and stirring heat is generally carried away on taking the polymer composition from the second reactor 20. The amount of the heat carried away by the polymer composition is determined by the flow rate and the specific heat of the polymer composition, and the temperature of the polymerization reaction.

The temperature of the continuous polymerization in the second polymerization step is understood as the temperature in the second reactor 20. The second polymerization step is conducted, for example, at a temperature in the range of 120 to 150° C., more preferably at a temperature in the range of 130 to 150° C. It is preferable to adjust the temperature in the second polymerization step so that temperature difference from the temperature of the continuous polymerization in the first polymerization step falls within 10° C. In the second polymerization step, though the temperature may be increased by polymerization heat generated in the polymerization reaction, it is possible to reduce difference between the temperature in the first polymerization step and the temperature in the second polymerization step by the intermediate cooling. As a result, the thermal stability and heat resistance is improved compared with when the polymerization is conducted at a lower temperature in the first reactor, then the polymerization is conducted at a higher temperature in the second reactor.

The pressure of the continuous polymerization in the second polymerization step is understood as the pressure in the second reactor 20. This pressure is generally about 1.0 to 2.0 MPa in gauge pressure, and may be equal to the pressure in the first polymerization step.

A time period subjected to the continuous polymerization in the second polymerization step is understood as an average residence time in the second reactor 20. The average residence time in the second reactor 20 can be set according to the productivity of the polymer in the polymer composition and so on, and is not particularly limited, but, for example, from 15 minutes to 6 hours. A ratio of the average residence time in the second reactor 20 to the average residence time in the first reactor 10 is preferably from 9/1 to 1/9, and more preferably from 8/2 to 2/8. The average residence time in the second polymerization step may be equal to the average residence time in the first polymerization step, but preferably different from it. The average residence time in the second reactor 20 can be adjusted by using the pumps 5 and 7 and, if present, the pump 19 to change the supply amount (supply flow rate) of the raw material monomer or the like to the second reactor 20. However, since the average residence time depends in a large part on the inner volume of the second reactor 20, how the inner volume of the first reactor 10 and the inner volume of the second reactor 20 are designed is important as hereinafter described.

As described in the above, the polymer composition is continuously taken from the effluent port 21b of the second reactor 20. The obtained polymer composition comprises the generated polymer, and may further comprise the unreacted raw material monomer, the unreacted polymerization initiator, decomposed substance of the polymerization initiator, and so on.

Although this embodiment is not limited thereto, the polymerization ratio in the polymer composition is, for example, 30 to 90% by weight. The polymerization ratio in the polymer composition generally corresponds to the content ratio of the polymer in the polymer composition. The higher the polymerization ratio, the higher the productivity of the polymer, but also the higher the viscosity of the composition from intermediate composition to the polymer composition, resulting in the larger the necessary power for stirring. The lower the polymerization ratio, the lower the productivity of the polymer, resulting in the larger the load for recovering the unreacted raw material monomer. Therefore, it is preferable to set an appropriate polymerization ratio as a target or a guide.

According to this embodiment, in order to achieve the desired polymerization ratio and low polymerization temperature in the second reactor 20, simultaneously, the cooling means of the connection line is controlled so as to make the temperature in the connection line adjacent to the supply port of the second reactor lower than the temperature in the first reactor detected by the temperature detecting means of the first reactor, thereby it is possible to produce the polymer composition having superior thermal stability and heat resistance with high productivity.

In general, the following tendency is observed: the higher the polymerization temperature, the lower the syndiotacticity of the obtained polymer, the lower the heat resistance of a resin composition obtained in the end. Therefore, it is preferable to conduct a polymerization at a low temperature to obtain a resin composition having high heat resistance. However, if continuous polymerization is conducted in one stage only at a lower temperature with the use of the conventional continuous polymerization apparatus (Patent Literatures 1 and 2), a long time is required to achieve the desired polymerization ratio. Therefore, it requires a larger reactor, furthermore larger space to realize a longer average residence time, so that it is not efficient. In addition, when the average residence time is longer than necessary, the generation of the oligomer such as a dimer and trimer is increased, thereby a concern of decreasing the heat resistance of the resin obtained from the polymer composition is raised.

In addition, the amount of the polymerization initiator can be set depending on other factors such as a polymerization temperature, a desired polymerization ratio, and an average residence time, and so on. The lower the polymerization temperature or the shorter the average residence time, the larger the amount of the polymerization initiator required for achieving the desired polymerization ratio. However, the larger the amount of the polymerization initiator, the larger the remained amount of the terminal part which consists of a unstable unsaturated bond and at which polymerization is stopped (terminal polymer) in the polymer composition, as a result, the thermal stability of the resin composition finally obtained tends to be decreased. Also, the much higher the polymerization temperature, the larger the generated amount of the terminal part which consists of an unsaturated bond derived from the polymerization initiator and at which polymerization is stopped (terminal polymer) in the polymer composition, as a result, the thermal stability of the resin composition finally obtained tends to be decreased.

In this embodiment, for example, the continuous polymerization is conducted at the temperature in the given range (for example, 120-150° C.) in the first polymerization step, then the continuous polymerization can be further conducted at the temperature in the same range as in the first polymerization step (for example, 120-150° C.) in the second polymerization step. Specifically, a cooling step is conducted in the connection line between the first reactor and the second reactor and additional polymerization initiator is supplied to the second reactor so as to reduce the difference between the temperature of the continuous polymerization in the first polymerization step and the temperature of the continuous polymerization in the second polymerization step, and then an adiabatic polymerization can be conducted. As a result, the continuous polymerization can be effectively conducted in the smaller space compared with when it is conducted in one stage at a lower temperature, and can produce the polymer composition suitable for obtaining a resin composition which has higher heat resistance and contains lower impurities such as gel generated by an adiabatic polymerization compared with when it is conducted in one stage at a higher temperature.

Further, in this embodiment, for example, a time period subjected to the continuous polymerization in the first polymerization step can differ from a time period subjected to the continuous polymerization in the second polymerization step. Specifically, it is possible to differentiate between the first reactor and the second reactor in an average residence time by designing the reactors so as to make the inner volume of the first reactor and the inner volume of the second reactor different from each other. Further, it is possible to differentiate between the first reactor and the second reactor in an average residence time by adding additional polymerization initiator together with the raw material monomer to the second reactor. When the average residence time is increased, by controlling the residence time and the polymerization ratio in the first reactor and the second reactor, it is possible to decrease the amount of the polymerization initiator to be supplied to the reactor, thereby obtaining the polymer composition suitable for regulating the thermal stability of the whole of the resin composition to obtain the resin composition having high thermal stability.

How the polymerization reaction conditions are set for each of the first polymerization step and the second polymerization step may vary according to the polymer generated, the raw material monomer and the polymerization initiator used, the heat resistance, thermal stability and productivity desired, and so on.

Devolatilization Step

As described in the above, the polymer composition (polymerization syrup) taken from the effluent port 21*b* of the second reactor 20 may comprise the unreacted raw material monomer and polymerization initiator and so on, in addition to the generated polymer. Although this embodiment is not limited thereto, such polymer composition is preferably subjected to, for example, devolatilization to separate and recover the raw material monomer.

More specifically, the polymer composition is transferred to the preheater 31 through the effluent line 25. The polymer composition in the preheater 31 is added with a part or all of an amount of heat necessary to volatilize the volatile component which is mainly composed of the unreacted raw material monomer. Then, the polymer composition is transferred to the devolatilizing extruder via the pressure adjusting valve (not shown in the drawings), and the volatile component is at least partially removed in the devolatilizing extruder, and a residual extruded object is formed into pellets and discharged from the discharge line 35. Thereby, the resin composition comprising a methacrylic ester polymer is produced in the form of the pellets.

As a method for transferring the above polymer composition, a method described in JP 4-48802 B is preferable. As a method of using a devolatilizing extrude, methods described in, for example, JP 3-49925 A, JP 51-29914 B, JP 52-17555 B, JP 1-53682 B, JP 62-89710 A and so on are preferable.

Further, during or after devolatilization of the polymer composition in the devolatilizing extruder described above, the polymer composition or the extruded object can be added with lubricants such as higher alcohols and higher fatty acid esters, an ultraviolet absorbing agent, a thermal stabilizing agent, colorant, an antistatic agent and so on, in order to incorporate them into the resin composition, if necessary.

The volatile component removed in the devolatilizing extruder 33 consists primarily of the unreacted raw material monomer and includes impurities; e.g. impurities originally contained in the raw material monomer, additives used if necessary, volatile by-product(s) generated in the process of polymerization, oligomer such as dimer and trimer, decomposed substance of the polymerization initiator, and so on. In general, a larger amount of the impurities make the obtained resin composition colored, which is not preferable. Then, the volatile component removed in the devolatilizing extruder 33 (which consists primarily of the unreacted raw material monomer and includes impurities as described above) may be passed through a monomer recovery column (not shown in the drawings), and treated by means of distillation, adsorption and so on in the monomer recovery column to remove the impurities from the above described volatile component. Thereby, the unreacted raw material monomer can be recovered with high purity, so that it can be suitably reused as the raw material monomer for polymerization. For example, continuous distillation is conducted in the monomer recovery column to recover the unreacted raw material monomer with high purity as a distillate liquid from the top of the monomer recovery column, and it may be transferred and recycled to the raw material monomer tank 1 after it is reserved in the recovery tank 37 once, or it may be transferred and recycled to the raw material monomer tank 1 without being reserved in the recovery tank 37. On the other hand, the impurities removed in the monomer recovery column may be disposed as a waste.

In order to prevent the recovered raw material monomer from causing the polymerization reaction in the recovery tank 37 and/or the raw material monomer tank 1, it is preferable that a polymerization inhibitor exists in the recovery tank 37 or the raw material monomer tank 1 at a ratio of, for example, 2 to 8 ppm by weight with respect to the raw material monomer, and more preferably, in addition to this, an oxygen concentration in a gas phase in the recovery tank 37 or the raw material monomer tank 1 is set at 2 to 8% by volume. If the recovered raw material monomer is wanted to be preserved in the recovery tank 37 for a long time, it is preferable to reserve it at a low temperature of, for example, 0 to 5° C.

In this embodiment, the continuous bulk polymerization apparatus wherein the first reactor and the second reactor are both used to conduct the continuous bulk polymerization is described. However, the continuous polymerization apparatus of the present invention is not limited thereto, one or both of the first reactor and the second reactor may be used to conduct continuous solution polymerization. In such embodiment, since a solvent is used for the solution polymerization, the continuous polymerization apparatus is provided, in addition to a similar configuration to the continuous polymerization apparatus described in the above with reference to FIGS. 1-2, with a solvent tank and a supply line and a pump (supply means) associated with the solvent tank to supply the solvent to a certain reactor for conducting the solution polymerization. The solvent tank and the supply line and the pump (supply means) associated with the solvent tank are not particularly limited, those similar to conventionally used ones can be used. The solvent can be supplied to the certain reactor for conducting the solution polymerization after being mixed with the raw material monomer and/or the polymerization initiator, or can be supplied to the certain reactor for conducting the solution polymerization, directly. In the above certain reactor, the polymerization step is conducted similarly to the polymerization step described in the above with reference to FIGS. 1-2, except that the solvent is used in the polymerization reaction. As to the solvent, it is appropriately selected according to the raw material monomer of the solution polymerization reaction and so on, and not particularly limited, but examples thereof include toluene, xylene, ethyl benzene, methyl isobutyl ketone, methyl alcohol, ethyl alcohol, octane, decane, cyclohexane, decalin, butyl acetate, pentyl acetate, and so on. A ratio C:D is, for example, 70:30 to 95:5, and preferably 80:20 to 90:10, but not limited thereto, wherein C represents a supply flow rate (kg/h) of the raw material monomer to the certain reactor for conducting the solution polymerization, and D represents a supply flow rate (kg/h) of the solvent to this certain reactor.

The continuous polymerization apparatus and the process for producing the polymer composition of the present invention are hereinbefore described through the embodiment of the present invention in detail. According to the present invention, provided is, a novel continuous polymerization apparatus, and when such continuous polymerization apparatus are used, since the polymerization can be conducted in at least two stages in series by using at least the first reactor and the second reactor, it is possible to set the polymerization reaction conditions, specifically, the temperature, the time period (average residence time), the amount of the polymerization initiator (a ratio of the polymerization initiator to the raw material monomer) and so on in each of the first polymerization step and the second polymerization step, respectively. Therefore, depending on the desired polymerization temperature and polymerization ratio in the second reactor, the cooling means of the connection line can be controlled to make the temperature in the connection line adjacent to the supply port of the second reactor lower than the temperature in the first reactor detected by the temperature detecting means of the first reactor, thereby it becomes possible to control the syndiotacticity of the polymer contained in the finally obtained resin composition to more efficiently produce the polymer composition suitable for obtaining a resin composition having high heat resistance and thermal stability.

However, the present invention is not limited to the above embodiment, and various modifications can be made. For example, three or more reactors can be used to conduct the polymerization in three or more stages in series. Further, the process for producing the polymer composition of the present invention is continuously conducted preferably by using the continuous polymerization apparatus of the present invention, but it may be conducted in a batch method.

The polymer composition produced by the process of the present invention is preferably used as a material for a molded article, and the molded article obtained therefrom has an advantage of having high heat resistance and thermal stability. For example, the polymer composition produced by the process of the present invention (more specifically, the resin composition after devolatilization) is molded alone or together with any suitable other component(s) according to any molding process such as injection molding and extrusion molding to prepare a molded article. The polymer composition produced by the process of the present invention is preferably used for preparing a molded article by injection molding, and it is possible to prepare a molded article with good moldability and prevent silver streaks from occurring. Especially, since the resin composition comprising a methacrylic ester based polymer has a superior transparency, the molded article prepared from it by injection molding has high transparency and less occurrence of silver streaks and good moldability, and therefore it is preferably utilized as a material for a light guide plate, which is used as a member of a backlight unit for various types of liquid crystal displays, or for vehicle members such as a rear lamp cover, a head lamp cover, a visor, a meter panel, and so on.

Injection molding can be conducted by filling (injecting into) a mold having a certain thickness with at least the polymer composition produced by the process of the present invention in a molten state, followed by cooling, and then thus molded article is released from the mold. More specifically, the molded article can be prepared by, for example, supplying a molding machine from a hopper with the polymer composition produced by the process of the present invention (more specifically, the resin composition after devolatilization) alone or in combination with any other suitable components, retracting and rotating a screw to measure the resin composition in a cylinder of the molding machine, melting the resin composition in the cylinder, filling a mold (e.g. metal mold) with the molten resin composition under pressure, holding the pressure for a certain time period until the mold is sufficiently cooled, opening the mold to eject the molded article therefrom.

Thus, according to another aspect of the present invention, there is also provided a molded article prepared from the polymer composition produced by the process of the present invention. It is noted that conditions for preparing the molded article of the present invention from the polymer composition (for example, in a case of injection molding, a temperature for melting a molding material, a temperature of a mold to which the molding material is injected, a pressure to be held after the mold is filled with the molding material, and so on) can be appropriately set and are not specifically limited.

EXAMPLES

Examples of the process for producing polymer composition of the present invention are shown below, though the present invention is not limited to these Examples.

Example 1

In this Example, generally, continuous polymerization was conducted in two stages according to the embodiment described above with reference to FIG. 1 to produce a polymer composition in the form of pellets (resin composition). More specifically, this was as explained below.

A raw material monomer mixed liquid 1 was prepared by mixing 98.606 parts by mass of methyl methacrylate and 0.987 part by mass of methyl acrylate together, and adding thereto 0.284 part by mass of n-octyl mercaptan as a chain transfer agent, and 0.123 part by mass of stearyl alcohol as a mold release agent.

A polymerization initiator mixed liquid 1 was prepared by mixing 99.790 parts by mass of methyl methacrylate, and 0.210 part by mass of t-amyl peroxy-2-ethylhexanoate as a polymerization initiator.

A polymerization initiator mixed liquid 2 was prepared by mixing 99.880 parts by mass of methyl methacrylate, and 0.120 part by mass of t-amyl peroxy-2-ethylhexanoate as a polymerization initiator.

For producing a polymer composition in this Example, the apparatus shown in FIG. 1 was used. A reactor of a complete mixing type having a capacity of 13 litters was used as the first reactor 10, and a reactor of a complete mixing type having a capacity of 6 litters was used as the second reactor 20. The raw material monomer mixed liquid 1, the polymerization initiator mixed liquid 1, and the polymerization initiator mixed liquid 2 as prepared above were charged to the raw material monomer tank 1, the polymerization initiator tank 3, and the polymerization initiator tank 17, respectively.

The raw material monomer mixed liquid 1 and the polymerization initiator mixed liquid 1 flowed through the raw material supply line 9 respectively from the raw material monomer tank 1 and the polymerization initiator tank 3, and were continuously supplied to the first reactor 10 through the supply port 11a located at its lower part.

The supply of the raw material monomer mixed liquid 1 and the polymerization initiator mixed liquid 1 to the first reactor 10 was conducted so that a ratio of flow rates of them was 19.2:1 and an average residence time in the first reactor 10 was 64 minutes. A temperature in the first reactor 10 was 140° C., and a temperature of the jacket 13 surrounding the outer surface of the first reactor 10 was set at 140° C., so that the continuous polymerization was conducted under an adiabatic condition with substantially no heat transfer. This continuous polymerization was conducted under a condition in which the first reactor 10 was filled with a reaction mixture (mixed liquid) and substantially no gas phase was present (fully filled condition). A half-life ($\tau$) of t-amyl peroxy-2-ethylhexanoate is 14 seconds at 140° C.

The reaction mixture in the first reactor 10 was continuously taken out as an intermediate composition from the effluent port 11b located on the top of the first reactor 10. The intermediate composition thus taken was continuously flowed through the connection line 15 and supplied to the second reactor 20 through the supply port 21a located at its lower part. The connection line 15 was provided with the jacket 16 surrounding its outer surface. A temperature of this jacket 16 was set at 100° C. A temperature in the connection line 15 adjacent to the supply port 21a of the second reactor 20, in the other words, a temperature of the intermediate composition in the supply port 21a of the second reactor 20 was 105° C. Considering a temperature of the intermediate composition in the effluent port 11b of the first reactor 10 as the same temperature in the first reactor 10, i.e. 140° C., is allowable. In addition, the polymerization initiator mixed liquid 2 was continuously supplied from the polymerization initiator tank 17 to the second reactor 20 through the another supply port 21c.

The supply of the intermediate composition and the polymerization initiator mixed liquid 2 to the second reactor 20 was conducted so that a ratio of flow rates of them was 24.7:1. An average residence time in the second reactor 20 was 26 minutes. A temperature in the second reactor 20 was 140° C., and a temperature of the jacket 23 surrounding the outer surface of the second reactor 20 was set at 140° C., so that the continuous polymerization was conducted under an adiabatic condition with substantially no heat transfer. This continuous polymerization was conducted under a condition in which the second reactor 20 was filled with a reaction mixture (mixed liquid) and substantially no gas phase was present (fully filled condition).

The reaction mixture in the second reactor 20 was continuously taken out as a polymer composition from the effluent port 21b located on the top of the second reactor 20. The polymer composition thus obtained was continuously flowed through the effluent line 25 and heated in the preheater 31 to 200° C., and a volatile component such as the unreacted raw material monomer was separated therefrom at 240° C. by the devolatilizing extruder 33 equipped with a vent. A resin composition obtained after devolatilization was extruded in a molten state, cooled with water, and then cut into pellets which were discharged from the discharge line 35. Thus, the resin composition was produced in the form of pellets. The conditions in this Example are shown in Table 1.

A polymerization ratio (wt %) was determined from the supply weights per hour of the raw material monomer mixed liquid 1, the polymerization initiator mixed liquid 1, and the polymerization initiator mixed liquid 2, and the production (discharge) weight per hour of the pellets. Further, with respect to the produced pellets, thermal stability (wt %) and heat resistance (° C.) were evaluated, and reduced viscosity ($cm^3/g$) was measured as explained below. Results of them are shown in Table 2.

<Thermal Stability>

Using a TG-DTA apparatus ("TG/DTA 6300" manufactured by Seiko Instruments Inc.), the pellets produced in the above were subjected to temperature rising from 50° C. to 500° C. with a rising temperature rate of 2° C./min under nitrogen flow of 200 mL/min, and change in its weight was measured.

On the basis of the weight of the pellets at the point of 50° C., a weight loss therefrom was determined. Assuming that a rate of the weight loss was 100 wt % at the point of 500° C., a rate of the weight loss (wt %) from 260 to 300° C. was calculated.

The rate of the weight loss (wt %) from 260 to 300° C. represents thermal stability, showing that the smaller its value, the lesser occurrence of thermal degradation starting from an unsaturated end, i.e. the better the thermal stability.

<Heat Resistance>

Using a DSC apparatus ("DSC6200" manufactured by Seiko Instruments Inc.), according to the differential scanning calorimetry method provided in JIS K 7121, the pellets produced in the above were subjected to temperature rising to 150° C. with a rising temperature rate of 20° C./min under nitrogen flow of 100 mL/min and held for 5 minutes, and then subjected to temperature reduction to −50° C. with a falling temperature rate of 20° C./min and held for one minute. Then, they were subjected to temperature rising from −50° C. to 215° C. with a rising temperature rate of 10° C./min, and a mid-point glass transition temperature (Tmg) was determined. It shows that the larger its value, the higher the heat resistance.

<Reduced Viscosity>

In conformity with ISO 1628-6, 0.5 g of the pellets produced in the above was dissolved in chloroform to prepare a solution of 50 $cm^3$, its viscosity was determined by Cannon-Fenske viscometer at 25° C.

Comparative Example 1

In this Comparative Example, generally, the polymer composition was produced without cooling in the connection line between the first reactor and the second reactor. More specifically, the polymer composition was produced in the form of pellets similarly to Example 1, except for the following points.

Similarly to Example 1, a raw material monomer mixed liquid 1 was prepared by mixing 98.606 parts by mass of methyl methacrylate and 0.987 part by mass of methyl acrylate together, and adding thereto 0.284 part by mass of n-octyl mercaptan as a chain transfer agent, and 0.123 part by mass of stearyl alcohol as a mold release agent.

Similarly to Example 1, a polymerization initiator mixed liquid 1 was prepared by mixing 99.790 parts by mass of methyl methacrylate, and 0.210 part by mass of t-amyl peroxy-2-ethylhexanoate as a polymerization initiator.

A polymerization initiator mixed liquid 2' was prepared by mixing 99.860 parts by mass of methyl methacrylate, and 0.140 part by mass of 1,1-di(t-butylperoxy)cyclohexane as a polymerization initiator which is different from the polymerization initiator in the polymerization initiator mixed liquid 2 in Example 1.

In this Comparative Example, a temperature in the first reactor 10 was 140° C., and a temperature of the jacket 13 surrounding the outer surface of the first reactor 10 was set at 140° C., so that the continuous polymerization was conducted under an adiabatic condition with substantially no heat transfer (similarly to Example 1, a ratio of flow rates of the raw material monomer mixed liquid 1 and the polymerization initiator mixed liquid 1 which were supplied to the first reactor 10 was 19.2:1 and an average residence time in the first reactor 10 was 64 minutes). A temperature of the jacket 16 of the connection line 15 was set at 140° C. A temperature in the connection line 15 adjacent to the supply port 21a of the second reactor 20, in the other words, a temperature of the intermediate composition in the supply port 21a of the second reactor 20 was 140° C. Considering a temperature of the intermediate composition in the effluent port 11b of the first reactor 10 as the same temperature in the first reactor 10, i.e. 140° C., is allowable. In addition, a temperature in the second reactor 20 was 175° C., and a temperature of the jacket 23 surrounding the outer surface of the second reactor 20 was set at 175° C., so that the continuous polymerization was conducted under an adiabatic condition with substantially no heat transfer (similarly to Example 1, a ratio of flow rates of the intermediate composition and the polymerization initiator mixed liquid 2' which were supplied to the second reactor 20 was 24.7:1 and an average residence time in the second reactor 20 was 26 minutes). A half-life ($\tau$) of 1,1-di(t-butylperoxy)cyclohexane is 7 seconds at 175° C. The conditions in this Comparative Example are shown in Table 1.

Thus, the polymer composition was produced in the form of pellets (resin composition). In this Comparative Example, similarly to Example 1, a polymerization ratio (wt %) was determined from the supply weights per hour of the raw material monomer mixed liquid 1, the polymerization initiator mixed liquid 1 and the polymerization initiator mixed liquid 2', and the production (discharge) weight per hour of the pellets. Further, similarly to Example 1, with respect to the produced pellets, thermal stability (wt %) and heat resistance (° C.) were evaluated, and reduced viscosity (cm$^3$/g) was measured. Results of them are shown in Table 2.

Comparative Example 2

In this Comparative Example, generally, the polymer composition was produced without cooling in the connection line between the first reactor and the second reactor and with adding a polymerization inhibitor to the second reactor to inhibit the progress of the polymerization reaction. More specifically, the polymer composition was produced in the form of pellets similarly to Example 1, except for the following points.

Similarly to Example 1, a raw material monomer mixed liquid 1 was prepared by mixing 98.606 parts by mass of methyl methacrylate and 0.987 part by mass of methyl acrylate together, and adding thereto 0.284 part by mass of n-octyl mercaptan as a chain transfer agent, and 0.123 part by mass of stearyl alcohol as a mold release agent.

Approximately similarly to Example 1, a polymerization initiator mixed liquid 1 was prepared by mixing 99.801 parts by mass of methyl methacrylate, and 0.199 part by mass of t-amyl peroxy-2-ethylhexanoate as a polymerization initiator.

Differently from Example 1, the polymerization initiator mixed liquid 2 was not used. Instead, a polymerization inhibitor mixed liquid 1 which comprises 2,4-dimethyl-6-t-butylphenol as a polymerization inhibitor in methyl methacrylate at a concentration of 50 ppm by mass was prepared.

In this Comparative Example, a temperature in the first reactor 10 was 140° C., and a temperature of the jacket 13 surrounding the outer surface of the first reactor 10 was set at 140° C., so that the continuous polymerization was conducted under an adiabatic condition with substantially no heat transfer (similarly to Example 1, a ratio of flow rates of the raw material monomer mixed liquid 1 and the polymerization initiator mixed liquid 1 which were supplied to the first reactor 10 was 19.2:1 and an average residence time in the first reactor 10 was 64 minutes). A temperature of the jacket 16 of the connection line 15 was set at 140° C. A temperature in the connection line 15 adjacent to the supply port 21a of the second reactor 20, in the other words, a temperature of the intermediate composition in the supply port 21a of the second reactor 20 was 140° C. Considering a temperature of the intermediate composition in the effluent port 11b of the first reactor 10 as the same temperature in the first reactor 10, i.e. 140° C., is allowable. In this Comparative Example, the polymerization inhibitor mixed liquid 1 in place of the polymerization initiator mixed liquid 2 was stored in the polymerization initiator tank 17. The polymerization inhibitor mixed liquid 1 was continuously supplied from the polymerization initiator tank 17 to the second reactor 20 through the another supply port 21c. The supply of the intermediate composition and the polymerization inhibitor mixed liquid 1 to the second reactor 20 was conducted so that a ratio of flow rates of them was 24.7:1. In addition, a temperature in the second reactor 20 was 140° C., and a temperature of the jacket 23 surrounding the outer surface of the second reactor 20 was set at 140° C., so that the continuous polymerization was conducted under an adiabatic condition with substantially no heat transfer (similarly to Example 1, an average residence time in the second reactor 20 was 26 minutes). The conditions in this Comparative Example are shown in Table 1.

Thus, the polymer composition was produced in the form of pellets (resin composition). In this Comparative Example, similarly to Example 1, a polymerization ratio (wt %) was determined from the supply weights per hour of the raw material monomer mixed liquid 1, the polymerization initiator mixed liquid 1 and the polymerization inhibitor mixed liquid 1, and the production (discharge) weight per hour of the pellets. Further, similarly to Example 1, with respect to the produced pellets, thermal stability (wt %) and heat resistance (° C.) were evaluated, and reduced viscosity (cm$^3$/g) was measured. Results of them are shown in Table 2.

TABLE 1

| | | Example 1 | Comparative Example 1 | Comparative Example 2 |
|---|---|---|---|---|
| First reactor | Polymerization temperature (° C.) | 140 | 140 | 140 |
| | Half-life of Polymerization initiator $\tau$ (sec) | 14 | 14 | 14 |
| | Average residence time $\theta$ (sec) | 64 × 60 | 64 × 60 | 64 × 60 |
| | $\tau/\theta$ (—) | 0.0036 | 0.0036 | 0.0036 |
| Second reactor | Polymerization temperature (° C.) | 140 | 175 | 140 |
| | Half-life of Polymerization initiator $\tau$ (sec) | 14 | 7 | — |
| | Average residence time $\theta$ (sec) | 26 × 60 | 26 × 60 | 26 × 60 |
| | $\tau/\theta$ (—) | 0.0090 | 0.0045 | — |
| Temperature in the connection line (° C.) | | 105 | 140 | 140 |

TABLE 2

|  | Example 1 | Comparative Example 1 | Comparative Example 2 |
|---|---|---|---|
| Polymerization ratio (wt %) | 59 | 56 | 44 |
| Reduced viscosity (cm$^3$/g) | 59.0 | 56.1 | 56.0 |
| Thermal stability (wt %) | 2.2 | 2.9 | 1.8 |
| Heat resistance Tmg (° C.) | 117 | 115 | 116 |

As understood from Table 2, Example 1 produced the polymer composition (resin composition) having the thermal stability and the heat resistance better than those of Comparative Example 1, while the polymerization ratio and the reduced viscosity giving an indication of a molecular weight of the polymer were retained at an equal level to those of Comparative Example 1. Further, though Comparative Example 2 produced the polymer composition (resin composition) having the thermal stability better than that of Example 1, Example 1 produced the polymer composition showing the polymerization ratio better than that of Comparative Example 2, that is, with high productivity, thus Example 1 could more effectively produce the polymer composition (resin composition).

Example 2

In this Example, generally, according to the embodiment described above with reference to FIG. 1, the continuous polymerization was conducted in two stages to produce a polymer composition in the form of pellets (resin composition). Further, in order to evaluate its moldability, the produced pellets were molded into a molded article. More specifically, this was as explained below.

A raw material monomer mixed liquid 2 was prepared by mixing 92.2605 parts by mass of methyl methacrylate, 7.145 parts by mass of methyl acrylate and 0.076 part by mass of ethylene glycol dimethacrylate together, and adding thereto 0.375 part by mass of n-octyl mercaptan as a chain transfer agent, 0.121 part by mass of stearic monoglyceride and 0.013 part by mass of methyl stearate as mold release agents, 0.0005 part by mass of di-tert-dodecyl disulfide as a thermal stabilizing agent, and 0.009 part by mass of dimethyl 2-(p-methoxybenzylidene)malonate as an ultraviolet absorbing agent.

A polymerization initiator mixed liquid 3 was prepared by mixing 99.725 parts by mass of methyl methacrylate, and 0.275 part by mass of t-amyl peroxy-2-ethylhexanoate as a polymerization initiator.

A polymerization initiator mixed liquid 4 was prepared by mixing 89.099 parts by mass of methyl methacrylate and 10.8 parts by mass of methyl acrylate, and 0.101 part by mass of t-amyl peroxy-2-ethylhexanoate as a polymerization initiator.

For producing a polymer composition in this Example, the apparatus shown in FIG. 1 was used. A reactor of a complete mixing type having a capacity of 13 litters was used as the first reactor 10, and a reactor of a complete mixing type having a capacity of 6 litters was used as the second reactor 20. The raw material monomer mixed liquid 2, the polymerization initiator mixed liquid 3, and the polymerization initiator mixed liquid 4 as prepared above were charged to the raw material monomer tank 1, the polymerization initiator tank 3, and the polymerization initiator tank 17, respectively.

The raw material monomer mixed liquid 2 and the polymerization initiator mixed liquid 3 flowed through the raw material supply line 9 respectively from the raw material monomer tank 1 and the polymerization initiator tank 3, and were continuously supplied to the first reactor 10 through the supply port 11a located at its lower part.

The supply of the raw material monomer mixed liquid 2 and the polymerization initiator mixed liquid 3 to the first reactor 10 was conducted so that a ratio of flow rates of them was 16.7:1 and an average residence time in the first reactor 10 was 46 minutes. A temperature in the first reactor 10 was 140° C., and a temperature of the jacket 13 surrounding the outer surface of the first reactor 10 was set at 140° C., so that the continuous polymerization was conducted under an adiabatic condition with substantially no heat transfer. This continuous polymerization was conducted under a condition in which the first reactor 10 was filled with a reaction mixture (mixed liquid) and substantially no gas phase was present (fully filled condition).

The reaction mixture in the first reactor 10 was continuously taken out as an intermediate composition from the effluent port 11b located on the top of the first reactor 10. The intermediate composition thus taken was continuously flowed through the connection line 15 and supplied to the second reactor 20 through the supply port 21a located at its lower part. The connection line 15 was provided with the jacket surrounding its outer surface. This jacket 16 was used to be set at 100° C. A temperature in the connection line 15 adjacent to the supply port 21a of the second reactor 20, in the other words, a temperature of the intermediate composition in the supply port 21a of the second reactor 20 was 105° C. Considering a temperature of the intermediate composition in the effluent port 11b of the first reactor 10 as the same temperature in the first reactor 10, i.e. 140° C., is allowable. In addition, the polymerization initiator mixed liquid 4 was continuously supplied from the polymerization initiator tank 17 to the second reactor 20 through the another supply port 21c.

The supply of the intermediate composition and the polymerization initiator mixed liquid 4 to the second reactor 20 was conducted so that a ratio of flow rates of them was 18.3:1. An average residence time in the second reactor 20 was 19 minutes. A temperature in the second reactor 20 was 140° C., and a temperature of the jacket 23 surrounding the outer surface of the second reactor 20 was set at 140° C., so that the continuous polymerization was conducted under an adiabatic condition with substantially no heat transfer. This continuous polymerization was conducted under a condition in which the second reactor 20 was filled with a reaction mixture (mixed liquid) and substantially no gas phase was present (fully filled condition).

The reaction mixture in the second reactor 20 was continuously taken out as a polymer composition from the effluent port 21b located on the top of the second reactor 20. The polymer composition thus obtained was continuously flowed through the effluent line 25 and heated in the preheater 31 to 200° C., and a volatile component such as the unreacted raw material monomer was separated therefrom at 240° C. by the devolatilizing extruder 33 equipped with a vent. A resin composition obtained after devolatilization was extruded in a molten state, cooled with water, and then cut into pellets which were discharged from the discharge line 35. Thus, the resin composition was produced in the form of pellets. The conditions in this Example are shown in Table 3.

A polymerization rate (wt %) was determined from the supply weights per hour of the raw material monomer mixed liquid 2, the polymerization initiator mixed liquid 3, and the polymerization initiator mixed liquid 4, and the production (discharge) weight per hour of the pellets. Further, with respect to the produced pellets, MFR (melt mass flow rate) and moldability were evaluated as explained below. Results of them are shown in Table 4.

<MFR>

In conformity with JIS K 7210, with respect to the produced pellets, MFR was measured at 230° C. under a load of 37.3 N.

<Moldability>

The pellets produced in the above were supplied from a hopper to a molding machine set at a certain cylinder temperature, and injection molding was repeatedly conducted through the cylinder in this molding machine, thereby molded articles were prepared in sequence. Conditions for the injection molding are shown in below. After the cylinder temperature became stable, ten molded articles in sequence obtained by sequential ten shots (cycles) of injection molding were taken as samples, and a silver streaks occurrence ratio was determined by counting samples showing occurrence of silver streaks among these ten samples. More specifically, the molded articles were subjected to visual observation, and occurrence of silver streaks was recognized when silver streaks was observed in the molded article. The silver streaks occurrence ratio were determined for three different cylinder temperatures according to the similar procedures.

Metal Mold:
Rectangle of 23 cm×30.5 cm (plane view), thickness of 0.8 mm
One fan gate (located on a longitudinal side of the rectangle in the plane)
Gate width 304 mm
Molding Machine:
Electric servo drive injection molding machine ("J450ELIII-890H" manufactured by The Japan Steel Works, LTD.)
Cylinder Temperature:
300° C., 305° C., 310° C. at a nozzle head temperature (molding temperature)
Hopper Side Temperature:
220° C.
Molding Conditions:

| Injection pressure | 179 MPa |
| --- | --- |
| Injection speed | 160 mm/sec |
| Metal mold temperature | 80° C. |
| Injection time period | 0.4 sec |
| Back pressure | 15 MPa |
| Screw rotation speed | 45 rpm |
| Holding pressure | 45 MPa |
| Holding pressure time | 11 sec |

Molding Cycle:
100 sec (including cooling time of 70 sec)
Residence Time in Cylinder:
12 min Comparative Example 3

In this Comparative Example, generally, the polymer composition was produced without cooling in the connection line between the first reactor and the second reactor. More specifically, the polymer composition was produced in the form of pellets similarly to Example 2, except for the following points.

Approximately similarly to Example 2, a raw material monomer mixed liquid 2 was prepared by mixing 93.0835 parts by mass of methyl methacrylate, 6.375 parts by mass of methyl acrylate and 0.076 part by mass of ethylene glycol dimethacrylate together, and adding thereto 0.322 part by mass of n-octyl mercaptan as a chain transfer agent, 0.121 part by mass of stearic monoglyceride and 0.013 part by mass of methyl stearate as mold release agents, 0.0005 part by mass of di-tert-dodecyl disulfide as a thermal stabilizing agent, and 0.009 part by mass of dimethyl 2-(p-methoxybenzylidene) malonate as an ultraviolet absorbing agent.

Approximately similarly to Example 2, a polymerization initiator mixed liquid 3 was prepared by mixing 99.752 parts by mass of methyl methacrylate, and 0.248 part by mass of t-amyl peroxy-2-ethylhexanoate as a polymerization initiator.

A polymerization initiator mixed liquid 4' was prepared by mixing 90.280 parts by mass of methyl methacrylate and 9.6 parts by mass of methyl acrylate, and 0.120 part by mass of 1,1-di(t-butylperoxy)cyclohexane as a polymerization initiator which is different from the polymerization initiator in the polymerization initiator mixed liquid 4 in Example 2.

In this Comparative Example, a temperature in the first reactor 10 was 140° C., and a temperature of the jacket 13 surrounding the outer surface of the first reactor 10 was set at 140° C., so that the continuous polymerization was conducted under an adiabatic condition with substantially no heat transfer (similarly to Example 2, a ratio of flow rates of the raw material monomer mixed liquid 2 and the polymerization initiator mixed liquid 3 which were supplied to the first reactor 10 was 16.7:1 and an average residence time in the first reactor 10 was 46 minutes). A temperature of the jacket 16 of the connection line 15 was set at 140° C. A temperature in the connection line 15 adjacent to the supply port 21a of the second reactor 20, in the other words, a temperature of the intermediate composition in the supply port 21a of the second reactor 20 was 140° C. Considering a temperature of the intermediate composition in the effluent port 11b of the first reactor 10 as the same temperature in the first reactor 10, i.e. 140° C., is allowable. In addition, a temperature in the second reactor 20 was 175° C., and a temperature of the jacket 23 surrounding the outer surface of the second reactor 20 was set at 175° C., so that the continuous polymerization was conducted under an adiabatic condition with substantially no heat transfer (a ratio of flow rates of the intermediate composition and the polymerization initiator mixed liquid 4' which were supplied to the second reactor 20 was 18.3:1 and an average residence time in the second reactor 20 was 19 minutes). The conditions in this Comparative Example are shown in Table 3.

Thus, the polymer composition was produced in the form of pellets (resin composition). In this Comparative Example, similarly to Example 2, a polymerization rate (wt %) was determined from the supply weights per hour of the raw material monomer mixed liquid 2, the polymerization initiator mixed liquid 3, and the polymerization initiator mixed liquid 4', and the production (discharge) weight per hour of the pellets. Further, similarly to Example 2, the resin composition produced in this Comparative Example was molded to produce molded articles, and MFR (melt mass flow rate) and moldability were evaluated. Results of them are shown in Table 4.

Comparative Example 4

In this Comparative Example, generally, the polymer composition was produced without cooling in the connection line between the first reactor and the second reactor and with adding a polymerization inhibitor to the second reactor to inhibit the progress of the polymerization reaction. More specifically, the polymer composition was produced in the form of pellets similarly to Example 2, except for the following points.

Approximately similarly to Example 2, a raw material monomer mixed liquid 2 was prepared by mixing 95.0865 parts by mass of methyl methacrylate, 4.396 parts by mass of methyl acrylate and 0.076 part by mass of ethylene glycol dimethacrylate together, and adding thereto 0.298 part by mass of n-octyl mercaptan as a chain transfer agent, 0.121 part by mass of stearic monoglyceride and 0.013 part by mass of methyl stearate as mold release agents, 0.0005 part by mass of di-tert-dodecyl disulfide as a thermal stabilizing agent, and 0.009 part by mass of dimethyl 2-(p-methoxybenzylidene) malonate as an ultraviolet absorbing agent.

A polymerization initiator mixed liquid 3' was prepared by mixing 99.767 parts by mass of methyl methacrylate, and 0.233 part by mass of 1,1-di(t-butylperoxy)cyclohexane as a polymerization initiator which is different from the polymerization initiator in the polymerization initiator mixed liquid 3 in Example 2.

Differently from Example 2, the polymerization initiator mixed liquid 4 was not used. Instead, a polymerization inhibitor mixed liquid 2 which comprises 2,4-dimethyl-6-t-butylphenol as a polymerization inhibitor in methyl methacrylate at a concentration of 50 ppm by mass was prepared.

In this Comparative Example, a temperature in the first reactor 10 was 175° C., and a temperature of the jacket 13 surrounding the outer surface of the first reactor 10 was set at 175° C., so that the continuous polymerization was conducted under an adiabatic condition with substantially no heat transfer (similarly to Example 2, a ratio of flow rates of the raw material monomer mixed liquid 2 and the polymerization initiator mixed liquid 3' which were supplied to the first reactor 10 was 16.7:1 and an average residence time in the first reactor 10 was 46 minutes). A temperature of the jacket 16 of the connection line 15 was set at 175° C. A temperature in the connection line 15 adjacent to the supply port 21a of the second reactor 20, in the other words, a temperature of the intermediate composition in the supply port 21a of the second reactor 20 was 175° C. Considering a temperature of the intermediate composition in the effluent port 11b of the first reactor 10 as the same temperature in the first reactor 10, i.e. 175° C., is allowable. In this Comparative Example, the polymerization inhibitor mixed liquid 2 in place of the polymerization initiator mixed liquid 4 was stored in the polymerization initiator tank 17. The polymerization inhibitor mixed liquid 2 was continuously supplied from the polymerization initiator tank 17 to the second reactor 20 through the another supply port 21c. The supply of the intermediate composition and the polymerization inhibitor mixed liquid 2 to the second reactor 20 was conducted so that a ratio of flow rates of them was 18.3:1. In addition, a temperature in the second reactor 20 was 175° C., and a temperature of the jacket 23 surrounding the outer surface of the second reactor 20 was set at 175° C., so that the continuous polymerization was conducted under an adiabatic condition with substantially no heat transfer (similarly to Example 2, an average residence time in the second reactor 20 was 19 minutes). The conditions in this Comparative Example are shown in Table 3.

Thus, the polymer composition was produced in the form f pellets (resin composition). In this Comparative Example, similarly to Example 2, a polymerization rate (wt %) was determined from the supply weights per hour of the raw material monomer mixed liquid 2, the polymerization initiator mixed liquid 3', and the polymerization inhibitor mixed liquid 2, and the production (discharge) weight per hour of the pellets. Further, similarly to Example 2, the resin composition produced in this Comparative Example was molded to produce molded articles, and MFR (melt mass flow rate) and moldability were evaluated. Results of them are shown in Table 4.

TABLE 3

| | | Example 2 | Comparative Example 3 | Comparative Example 4 |
|---|---|---|---|---|
| First reactor | Polymerization temperature (° C.) | 140 | 140 | 175 |
| | Half-life of Polymerization initiator τ (sec) | 14 | 14 | 7 |
| | Average residence time θ (sec) | 46 × 60 | 46 × 60 | 46 × 60 |
| | τ/θ (—) | 0.0051 | 0.0051 | 0.0025 |
| Second reactor | Polymerization temperature (° C.) | 140 | 175 | 175 |
| | Half-life of Polymerization initiator τ (sec) | 14 | 7 | — |
| | Average residence time θ (sec) | 19 × 60 | 19 × 60 | 19 × 60 |
| | τ/θ (—) | 0.0123 | 0.0061 | — |
| Temperature in the connection line (° C.) | | 105 | 140 | 175 |

TABLE 4

| | | Example 2 | Comparative Example 3 | Comparative Example 4 |
|---|---|---|---|---|
| Polymerization ratio (wt %) | | 55.1 | 57.5 | 55.9 |
| MFR (g/10 min) | | 11 | 11 | 11 |
| Moldability (silver streaks occurrence ratio) (%) | 300° C. | 0 | 0 | 0 |
| | 305° C. | 0 | 0 | 30 |
| | 310° C. | 0 | 30 | 100 |

As understood from Table 4, Example 2 produced the polymer composition having the better moldability (lower silver streaks occurrence ratio in the molded article) than that of Comparative Examples 3 and 4 even when molded at a higher temperature (molding temperature higher than 300° C., e.g. at 305° C. or more, further, e.g. at 310° C. or more), while the polymerization rate was retained at an equal level and the MFR (which may give an indication for determining the molding conditions) was retained at an equal level to those of Comparative Examples 3 and 4.

Industrial Applicability

The present invention can be used for producing a polymer composition which is suitable for obtaining a resin composition comprising a methacrylic ester polymer(s).

The invention claimed is:

1. A continuous polymerization apparatus which comprises, at least, a first reactor and a second reactor which are of a complete mixing type,
   wherein each of the reactors is provided with a supply port, an effluent port, and a temperature detector for detecting a temperature in the reactor,
   the supply port of the first reactor is connected to supply sources of a raw material monomer and a polymerization initiator,
   the effluent port of the first reactor is connected through a connection line provided with cooler and a mixer to the supply port of the second reactor.

2. The continuous polymerization apparatus according to claim 1, wherein the effluent port of each of the reactors is placed at the top of the reactor.

3. The continuous polymerization apparatus according to claim 1, wherein the supply port of the second reactor or another supply port provided to the second reactor is connected to a supply source of an additional polymerization initiator.

4. The continuous polymerization apparatus according to claim 1, wherein the first reactor and the second reactor conduct a continuous bulk polymerization.

5. A process for producing a methacrylic ester polymer composition by using the continuous polymerization apparatus according to claim 1 which comprises:

continuously supplying a methacrylic ester monomer as a raw material monomer and a polymerization initiator from the supply sources of the methacrylic ester monomer and the polymerization initiator to the first reactor though the supply port of the first reactor to be subjected to continuous polymerization in the first reactor, and continuously taking a resultant intermediate composition from the effluent port of the first reactor, continuously cooling the intermediate composition by the cooler of the connection line during transport of the intermediate composition from the effluent port of the first reactor to the supply port of the second reactor through the connection line, and continuously supplying the cooled intermediate composition to the second reactor through the supply port of the second reactor to be further subjected to continuous polymerization in the second reactor, and continuously taking a resultant polymer composition from the effluent port of the second reactor.

6. The process for producing a polymer composition according to claim 5, wherein a temperature of the intermediate composition in the supply port of the second reactor is 5-80° C. lower than a temperature of the intermediate composition in the effluent port of the first reactor.

7. The process for producing a polymer composition according to claim 5, wherein a temperature in the first reactor detected by the temperature detector of the first reactor and a temperature in the second reactor detected by the temperature detector of the second reactor are within the range of 120-150° C.

\* \* \* \* \*